(12) United States Patent
Hori et al.

(10) Patent No.: US 10,013,626 B2
(45) Date of Patent: Jul. 3, 2018

(54) IMAGE PROCESSING APPARATUS AND IMAGE PROCESSING METHOD SETTING DIVISION SIZE FOR DIVIDING IMAGE DATA

(71) Applicant: CANON KABUSHIKI KAISHA, Tokyo (JP)

(72) Inventors: Shinjiro Hori, Yokohama (JP); Tetsuya Suwa, Yokohama (JP); Hidetsugu Kagawa, Kawasaki (JP); Yumi Yanai, Yokohama (JP); Tomokazu Ishikawa, Yokohama (JP); Wakako Tanaka, Inagi (JP); Tohru Ikeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/192,216

(22) Filed: Jun. 24, 2016

(65) Prior Publication Data

US 2017/0004376 A1    Jan. 5, 2017

(30) Foreign Application Priority Data

Jul. 1, 2015    (JP) .................................. 2015-132878

(51) Int. Cl.
   *G06K 9/46*    (2006.01)
   *H04N 1/00*    (2006.01)
   *G06K 9/38*    (2006.01)

(52) U.S. Cl.
   CPC ................. *G06K 9/46* (2013.01); *G06K 9/38* (2013.01); *H04N 1/00795* (2013.01); *H04N 2201/0094* (2013.01)

(58) Field of Classification Search
   None
   See application file for complete search history.

(56) References Cited

U.S. PATENT DOCUMENTS 8,503,031 B2    8/2013 Kajihara
8,619,319 B2    12/2013 Tsuchiya
(Continued)

FOREIGN PATENT DOCUMENTS

JP    2013-185862    9/2013

OTHER PUBLICATIONS

Kizuki, "Algorithm inspired by Peripheral Vision and Involuntary Eye Movement", Journal of the Japan Society for Precision Engineering, vol. 79, No. 11, 2013, p. 1045-1049.

(Continued)

*Primary Examiner* — Lennin Rodriguezgonzalez
(74) *Attorney, Agent, or Firm* — Fitzpatrick, Cella, Harper & Scinto

(57) ABSTRACT

An acquisition unit acquires image data resulting from reading an image printed sequentially in a first direction. A setting unit sets a division size in the first direction and a second direction of a division area for dividing the image data, the second direction crossing the first direction, as well as a shift amount in the first direction and the second direction of the division area. A processing unit performs a predetermined process including an averaging process on the image data in accordance with the division size and the shift amount. An extraction unit extracts a unique portion from image data on which the predetermined process has been performed. The setting unit sets (i) the division size greater in the second direction than in the first direction, and/or (ii) the shift amount greater in the second direction than in the first direction.

21 Claims, 22 Drawing Sheets

(56) References Cited

U.S. PATENT DOCUMENTS

| | | |
|---|---|---|
| 8,830,530 B2 | 9/2014 | Sano |
| 9,064,202 B2 | 6/2015 | Tanaka |
| 9,087,291 B2 | 7/2015 | Hori |
| 9,092,720 B2 | 7/2015 | Nakagawa |
| 9,210,292 B2 | 12/2015 | Miyake |
| 2003/0133606 A1 | 7/2003 | Yano |
| 2016/0167414 A1 | 6/2016 | Yanai |
| 2016/0167415 A1 | 6/2016 | Ikeda |
| 2016/0173725 A1 | 6/2016 | Kato |

OTHER PUBLICATIONS

U.S. Appl. No. 14/991,618, filed Jan. 8, 2016.
U.S. Appl. No. 15/192,229, filed Jun. 24, 2016.
U.S. Appl. No. 15/191,210, filed Jun. 23, 2016.
U.S. Appl. No. 15/192,243, filed Jun. 24, 2016.
U.S. Appl. No. 15/191,241, filed Jun. 23, 2016.
U.S. Appl. No. 15/191,226, filed Jun. 23, 2016.

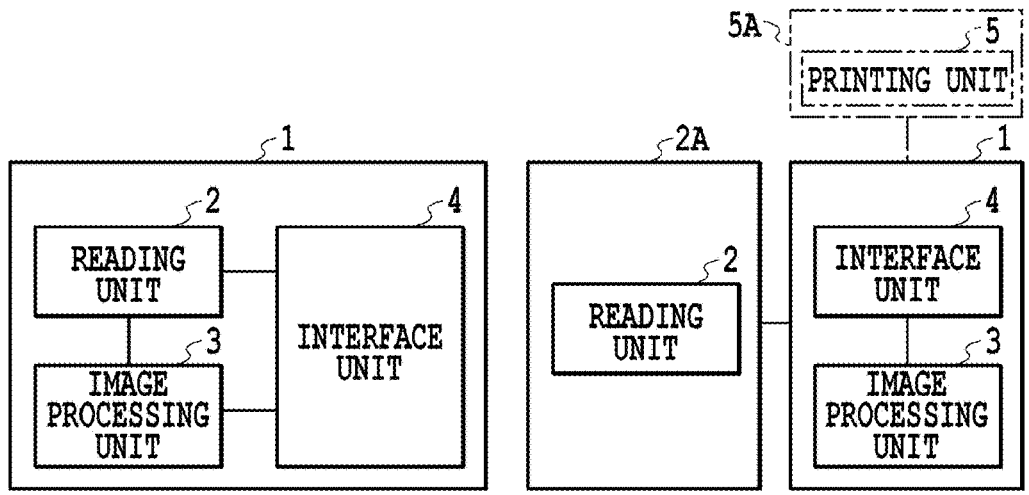
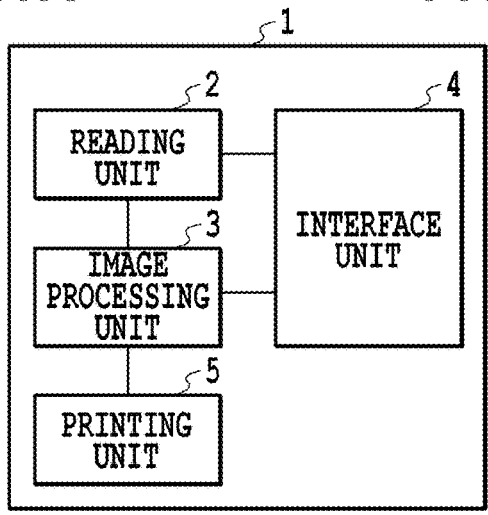
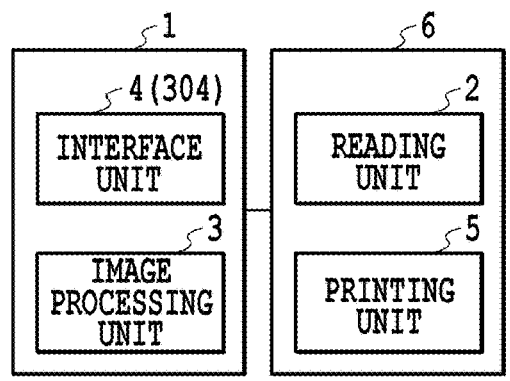
FIG.1A  FIG.1B  FIG.1C  FIG.1D

IMAGE PROCESSING APPARATUS AND IMAGE PROCESSING METHOD SETTING DIVISION SIZE FOR DIVIDING IMAGE DATA

BACKGROUND OF THE INVENTION

Field of the Invention

The present invention relates to an image processing apparatus and image processing method for extracting a defect in an inspection object.

Description of the Related Art

Japanese Patent Laid-Open No. 2013-185862 and ""KIZUKI" Algorithm inspired by Peripheral Vision and Involuntary Eye Movement", Journal of the Japan Society for Precision Engineering, Vol. 79, No. 11, 2013, p. 1045-1049 discloses an algorism for detecting a defect of an inspection object in accordance with a human visual mechanism. Specifically, after imaging an inspection object, the resulting image is divided into division areas having a predetermined size, averaging and quantization processes are performed for each division area. In addition, such processes are repeated for multiple cases having different sizes and/or phases of a division area, the resulting values quantized in the repeated image processes are added, and on the basis of the addition result the presence or absence of a defect and its position if present are determined. By employing such a method, a defect of an inspection object can be efficiently extracted and made apparent without any human observation.

When employing Japanese Patent Laid-Open No. 2013-185862 and ""KIZUKI" Algorithm inspired by Peripheral Vision and Involuntary Eye Movement", Journal of the Japan Society for Precision Engineering, Vol. 79, No. 11, 2013, p. 1045-1049, it is desirable to make various parameters such as a resolution in imaging an inspection object and a division size for image processing suitable in order to effectively detect a defect portion. For example, when the above algorithm is used to inspect an image printed by an inkjet printing apparatus in order to detect a stripe and unevenness specific to the inkjet printing apparatus, ranges of a read resolution and division size for a preferable detection vary depending on the features of the stripe and unevenness. If such parameters are not properly adjusted, it is possible that a defect portion cannot be extracted or a load and time for an extraction process is unnecessarily increased. However, Japanese Patent Laid-Open No. 2013-185862 and ""KIZUKI" Algorithm inspired by Peripheral Vision and Involuntary Eye Movement", Journal of the Japan Society for Precision Engineering, Vol. 79, No. 11, 2013, p. 1045-1049 do not describe a corresponding relationship between the features of a defect to be detected and their suitable parameters.

SUMMARY OF THE INVENTION

The present invention provides an image processing apparatus and image processing method that are able to effectively detect a defect portion in a print image by setting parameters suitable for a defect to be extracted.

In the first aspect of the present invention, there is provided an image processing apparatus comprising:

an acquisition unit configured to acquire image data resulting from reading an image printed sequentially in a first direction;

a setting unit configured to set a division size in the first direction and a second direction of a division area for dividing the image data, the second direction crossing the first direction, as well as a shift amount in the first direction and the second direction of the division area;

a processing unit configured to perform a predetermined process including an averaging process on the image data in accordance with the division size and the shift amount;

a quantization unit configured to quantize a value that is obtained by dividing the image data by a predetermined division size and performing the averaging process on the divided image data;

an adding unit configured to add a value obtained by the quantization unit for each of the cases where the image data is divided by a predetermined division size and different shift amounts; and an extraction unit configured to extract a unique portion from image data on which the predetermined process has been performed; wherein the setting unit sets (i) the division size greater in the second direction than in the first direction, and/or (ii) the shift amount greater in the second direction than in the first direction.

In the second aspect of the present invention, there is provided an image processing apparatus comprising:

an acquisition unit configured to acquire image data resulting from reading an image printed sequentially in a first direction;

a processing unit configured to perform a predetermined process including a filtering process using a filter on the image data;

a setting unit configured to set a size in the first direction and a second direction of the filter, the second direction crossing the first direction; and an extraction unit configured to extract a unique portion from image data on which the predetermined process has been performed, wherein the setting unit sets a size of the filter greater in the second direction than in the first direction.

In the third aspect of the present invention, there is provided a printing apparatus comprising:

an image processing apparatus;

a printing unit having multiple printing elements arrayed in a second direction; and a reading unit configured to read an image printed by the printing unit thereby to generate image data, the image processing apparatus comprising:

an acquisition unit configured to acquire image data from the reading unit, the image being printed sequentially in a first direction crossing the second direction by the printing unit;

a setting unit configured to set a division size in the first direction and the second direction of a division area for dividing the image data, and a shift amount in the first direction and the second direction of the division area;

a processing unit configured to perform a predetermined process including an averaging process on the image data in accordance with the division size and the shift amount;

a quantization unit configured to quantize a value that is obtained by dividing the image data by a predetermined division size and performing the averaging process on the divided image data;

an adding unit configured to add a value obtained by the quantization unit for each of the cases where the image data is divided by a predetermined division size and different shift amounts; and an extraction unit configured to extract a unique portion from image data on which the predetermined process has been performed; wherein the setting unit sets (i) the division size greater in the second direction than in the first direction, and/or (ii) the shift amount greater in the second direction than in the first direction.

In the fourth aspect of the present invention, there is provided an image processing method comprising:

an acquisition step of acquiring image data resulting from reading an image printed sequentially in a first direction;

a setting step of setting a division size in the first direction and a second direction of a division area for dividing the image data, the second direction crossing the first direction, as well as a shift amount in the first direction and the second direction of the division area;

a processing step of performing a predetermined process including an averaging process on the image data in accordance with the division size and the shift amount;

a quantization step of quantizing a value that is obtained by dividing the image data by a predetermined division size and performing the averaging process on the divided image data;

an adding step of adding a value obtained by the quantization step for each of the cases where the image data is divided by a predetermined division size and different shift amounts; and an extraction step of extracting a unique portion from image data on which the predetermined process has been performed; wherein the setting step sets (i) the division size greater in the second direction than in the first direction and/or (ii) the shift amount greater in the second direction than in the first direction.

In the fifth aspect of the present invention, there is provided an image processing method comprising:

an acquisition step of acquiring image data resulting from reading an image printed sequentially in a first direction;

a processing step of performing a predetermined process including a filtering process using a filter on the image data;

a setting step of setting a size in the first direction and a second direction of the filter, the second direction crossing the first direction; and an extraction step of extracting a unique portion from image data on which the predetermined process has been performed; wherein the setting step sets a size of the filter greater in the second direction than in the first direction.

According to the present invention, a unique portion to be extracted can be efficiently extracted.

Further features of the present invention will become apparent from the following description of exemplary embodiments (with reference to the attached drawings).

BRIEF DESCRIPTION OF THE DRAWINGS

FIGS. 1A to 1D are diagrams illustrating examples of forms of an image processing apparatus 1 usable in the present invention;

DESCRIPTION OF THE EMBODIMENTS

Figure 2:
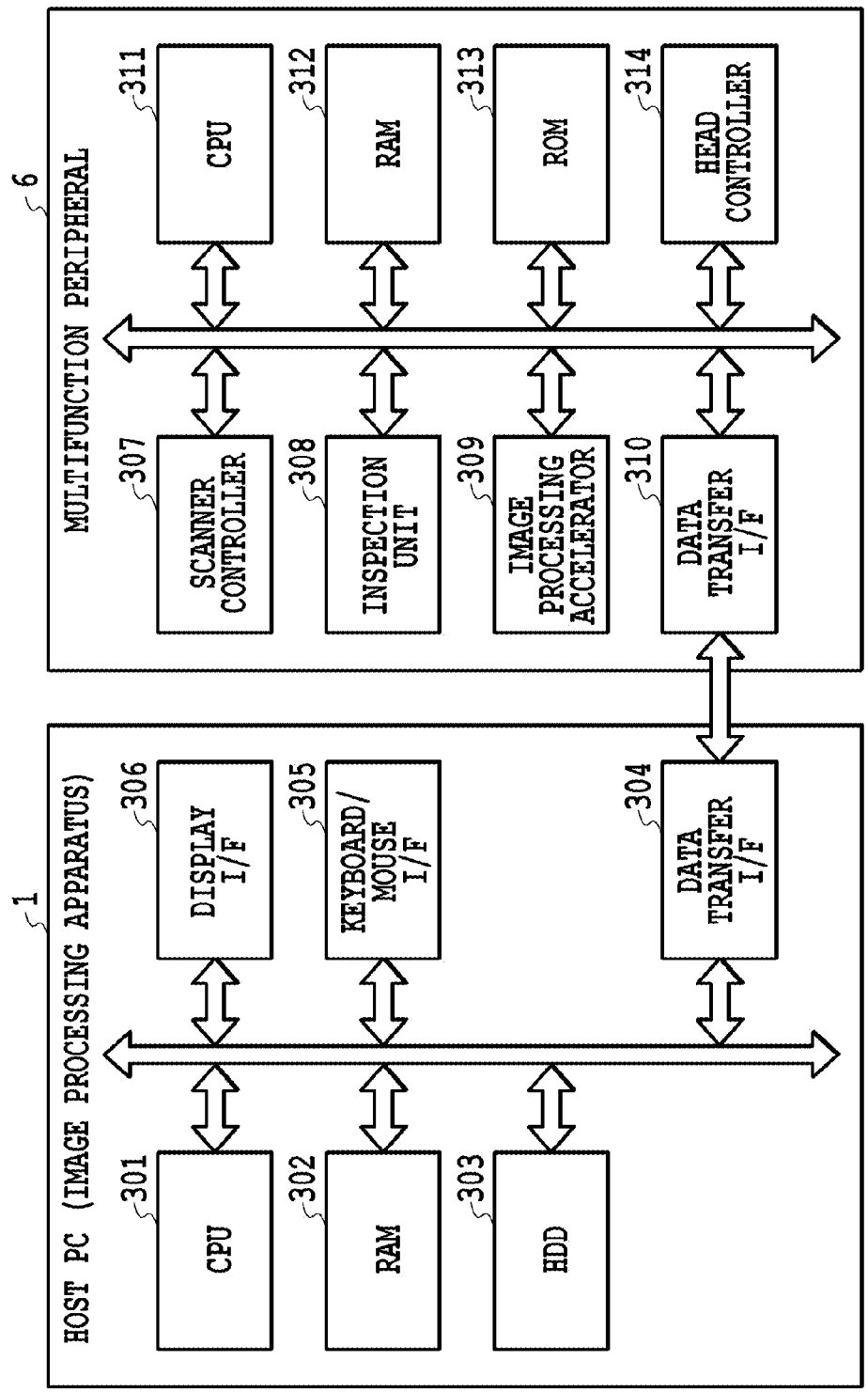
FIG. 2 is a block diagram for explaining a configuration of control in an image processing system.

FIGS. 1A to 1D are diagrams illustrating examples of forms of an image processing apparatus 1 usable in the present invention. The image processing apparatus of the present invention performs on imaged image data a pop-up process for making an image defect portion easily-recognizable by a user and a process for the apparatus itself determining the image defect portion, and can employ various forms as a system.

FIG. 1A illustrates a form in which the image processing apparatus 1 includes a reading unit 2. For example, this form corresponds to the case where a sheet having a predetermined image printed by an inkjet printing apparatus is placed on a reading table of the reading unit inside the image processing apparatus 1 and imaged by, for example, an optical sensor, and the resulting image data is processed by an image processing unit 3. The image processing unit 3 includes a CPU or an image processing accelerator capable of higher speed processing than the CPU, controls a reading action by the reading unit 2 and performs a predetermined inspection process on received image data.

FIG. 1B illustrates a form in which an image processing apparatus 1 is externally connected to a reading apparatus 2A including the reading unit 2. For example, this form corresponds to a system in which a PC is connected to a scanner. A method for the connection may be a general one such as USB, GigE, or Camera Link. Image data read by the reading unit 2 is provided through an interface 4 to the image processing unit 3 and the image processing unit performs a predetermined inspection process on the received image data. In this form, the image processing apparatus 1 may be further externally connected to a printing apparatus 5A including a printing unit 5.

FIG. 1C illustrates a form in which the image processing apparatus 1 includes the reading unit 2 and the printing unit 5. For example, this form corresponds to a multifunction peripheral including a scanner function, a printer function, and an image processing function. The image processing unit 3 controls all of a printing action by the printing unit 5, a reading action by the reading unit 2, and an inspection process on the image read by the reading unit 2.

FIG. 1D illustrates a form in which the image processing apparatus 1 is externally connected to a multifunction peripheral 6 including the reading unit 2 and the printing unit 5. For example, this form corresponds to a system in which a PC is connected to a multifunction peripheral including both of a scanner function and a printer function.

The image processing apparatus 1 of the present invention can employ any of the forms in FIGS. 1A to 1D. In the following, embodiments of the present invention will be described in detail, taking the case where the form in FIG. 1D is employed, as an example.

First Embodiment

FIG. 2 is a block diagram for explaining a configuration of control in the form in FIG. 1D. The image processing apparatus 1 is made of, for example, a host PC, in which a CPU 301 performs various processes in accordance with programs held in an HDD 303 while using a RAM 302 as a work area. For example, the CPU 301 generates image data printable by the multifunction peripheral 6 in accordance with a command received from a user through a keyboard/mouse I/F 305 and programs held in the HDD 303, and transfers the image data to the multifunction peripheral 6. Also, the CPU 301 performs a predetermined process in accordance with programs stored in the HDD on image data received from the multifunction peripheral 6 through a data transfer I/F 304, and displays the result of the process or various pieces of information on an unillustrated display through a display I/F 306.

In the multifunction peripheral 6, a CPU 311 performs various processes in accordance with programs held in a ROM 313 while using a RAM 312 as a work area. In addition, the multifunction peripheral 6 includes: an image processing accelerator 309 for performing a high-speed image processing; a scanner controller 307 for controlling the reading unit 2; a head controller 314 for controlling the printing unit 5; and an inspection unit 308.

The image processing accelerator 309 is hardware capable of performing image processing at higher speed than the CPU 311. The image processing accelerator 309 is activated by the CPU 311 writing parameters and data necessary for image processing in a predetermined address of the RAM 312, and after reading the parameters and data, performs predetermined image processing on the above data. Note that the image processing accelerator 309 is not an indispensable component, and the CPU 311 can perform an equivalent process.

The head controller 314 supplies print data to a print head 100 provided in the printing unit 5 as well as controlling a printing action of the print head 100. The head controller 314 is activated by the CPU 311 writing print data printable by the print head 100 and control parameters in a predetermined address of the RAM 312, and performs an ejecting action in accordance with the print data The scanner controller 307 controls respective reading elements arrayed in the reading unit 2 and at the same time outputs RGB luminance data obtained from the reading elements to the CPU 311. The CPU 311 transfers the obtained RGB luminance data to the image processing apparatus 1 through a data transfer I/F 310. As a method for the connection between the data transfer I/F 304 of the image processing apparatus 1 and the data transfer I/F 310 of the multifunction peripheral 6, a USB, IEEE 1394 or LAN, for example, can be used.

Figure 3:
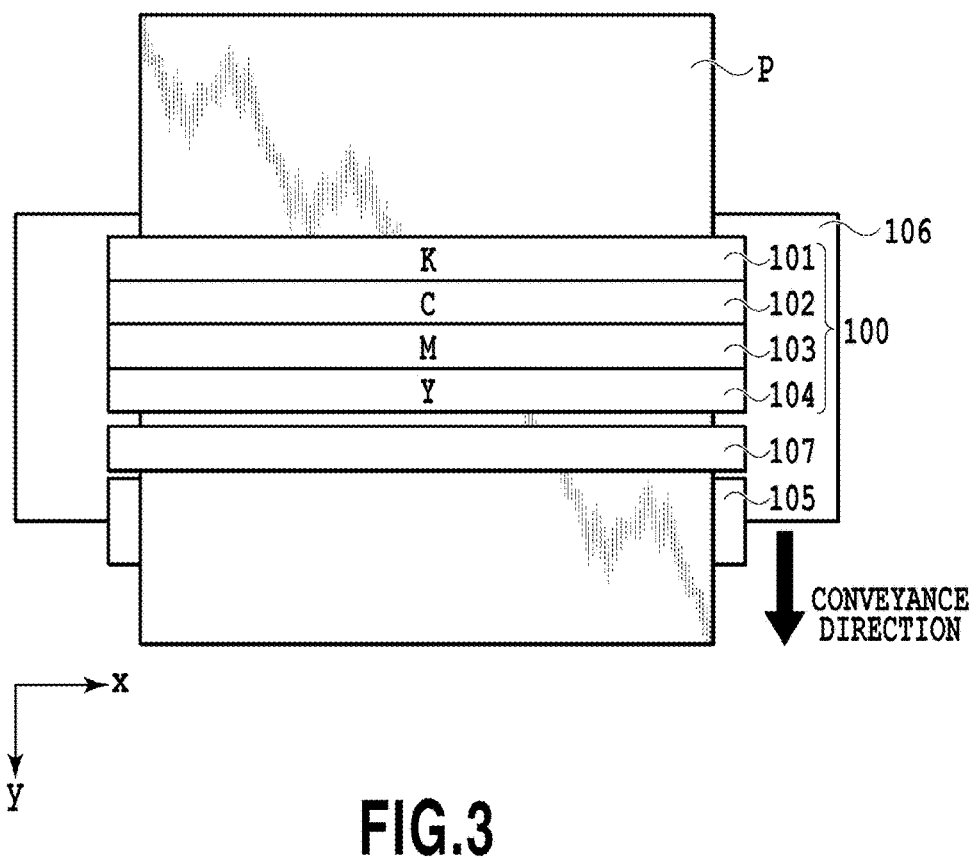
FIG. 3 is a schematic configuration diagram illustrating an inkjet printing apparatus as a multifunction peripheral usable in the present invention.

FIG. 3 is a schematic configuration diagram of an inkjet printing apparatus (hereinafter also simply referred to as a printing apparatus) usable as the multifunction peripheral 6 in this embodiment. A printing apparatus in this embodiment is a full-line type printing apparatus, in which the print head 100 and read head 107 having the same width as that of a print medium and the sheet P, which may be an inspection object, are arranged in parallel. The print head 100 is provided with four printing element arrays 101 to 104 ejecting black (K), cyan (c), magenta (M), yellow (y) inks, respectively. These printing element arrays 101 to 104 are arranged in parallel in the conveyance direction (Y direction) of the sheet P. Downstream of the printing element arrays 101 to 104 are disposed the read head 107. In the read head 107, multiple reading elements for reading a printed image are arrayed in an X direction.

In performing printing and reading processes, the sheet P is conveyed in the Y direction in FIG. 3 at a predetermined speed along with rotation of a conveyance roller 105, and during the conveyance, the printing process by the print head 100 and the reading process by the read head 107 are performed. In this way, in the printing apparatus, an image is printed on the sheet P along with the relative movement of the print head 100 and the sheet P. The sheet P is supported from below by a flat plate-shaped platen 106 at a position where the printing process by the print head 100 and the reading process by the read head 107 are performed, which maintains distances between the sheet P and the print head 100 and read head 107, and smoothness.

Figure 4A:
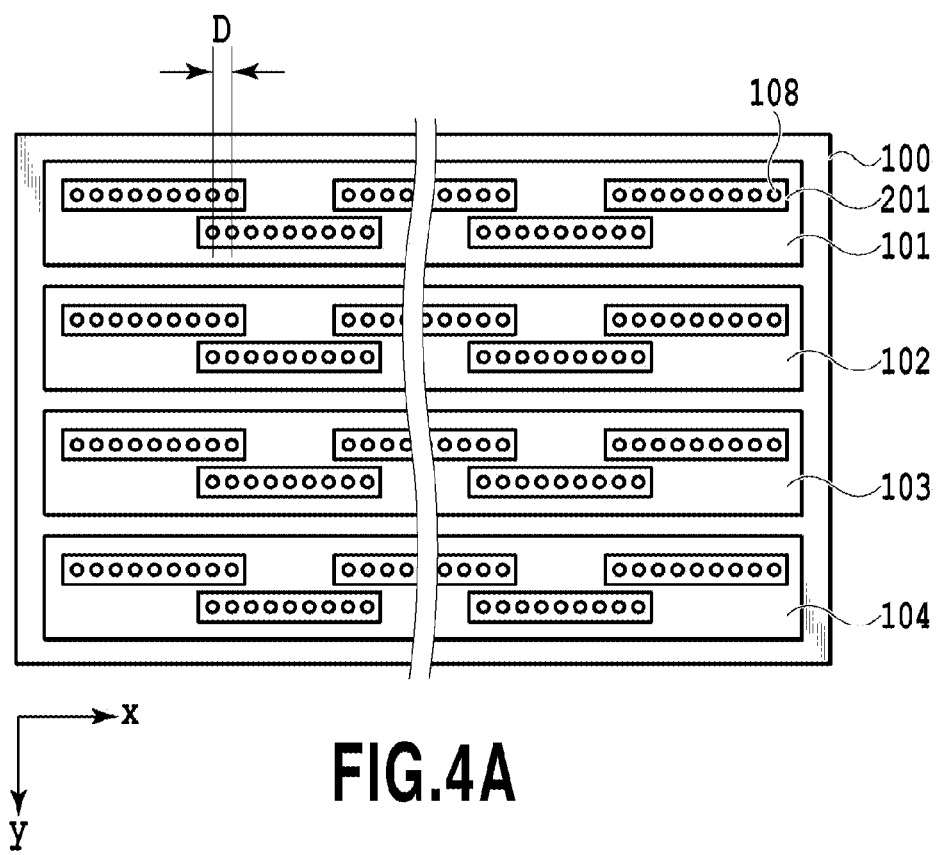
FIGS. 4A and 4B are diagram illustrating an array configuration of printing elements and an array configuration of reading elements, respectively.
Figure 4B:
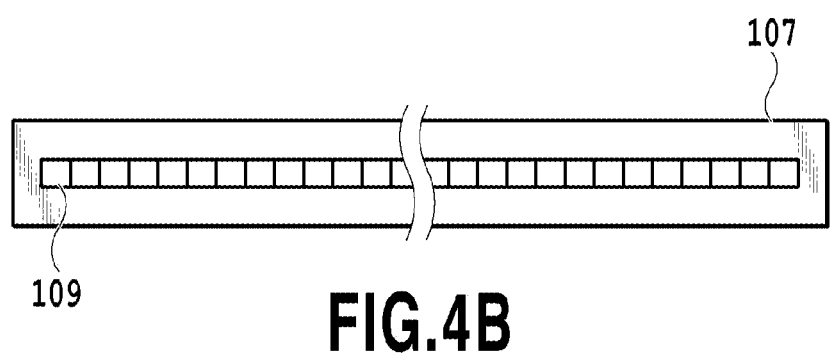

FIG. 4A is a diagram illustrating an array configuration of printing elements in the print head 100. FIG. 4B is a diagram illustrating an array configuration of reading elements in the read head 107. As illustrated in FIG. 4A, in each of the printing element arrays 101 to 104, multiple printing elements 108 are arrayed in the X direction. In the printing head 100, on each of the printing element arrays 101 to 104 corresponding to the respective ink colors, multiple printing element substrates 201 on which the multiple printing elements 108 are arrayed in a constant pitch are arranged continuously in the X direction and alternately in the Y direction while providing overlap regions D. The respective printing elements 108 eject ink at a constant frequency according to print data onto the sheet P being conveyed in the Y direction at a constant speed, and thereby an image is printed on the sheet P at a resolution corresponding to the array pitch of the printing elements 108.

As illustrated in FIG. 4B, in the read head 107, multiple reading sensors 109 are arrayed in the X direction at a predetermined pitch. Further, though not illustrated in FIG. 4B, each reading sensor 109 is composed such that multiple reading elements, which may be the minimum unit of read pixels, are arrayed in the X direction. The reading elements of the respective reading sensors 109 image, at a predetermined frequency, an image on the sheet P being conveyed in the Y direction at a constant speed, and thereby the whole image printed on the sheet P can be read at the array pitch of the reading elements.

Here, the X direction (second direction) refers to the array direction of the multiple printing elements, and the Y direction (first direction) refers to the direction that crosses the X direction and in which an image is serially printed.

In the following, a defect detection algorithm in this embodiment will be specifically described. In the defect detection algorithm in this embodiment, a printed image is imaged, and on the resulting image data is performed predetermined image processing for extracting a unique portion such as a defect. Although image printing may not be necessarily performed by an inkjet printing apparatus as the multi-function peripheral 6, in the following the case will be described in which an image printed by the print head 100 of the multi-function peripheral 6 is read by the read head 107.

Figure 5:
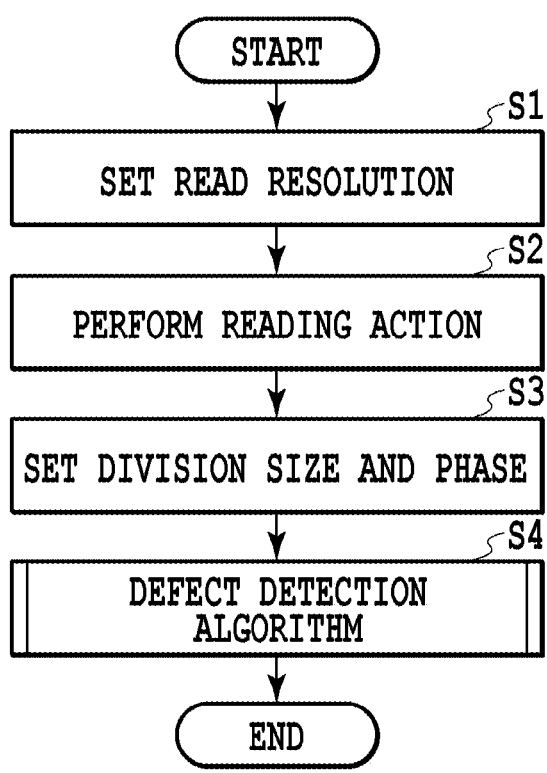
FIG. 5 is a flowchart illustrating basic steps of defect detection according to a first embodiment.

FIG. 5 is a flowchart for explaining basic steps of defect detection performed by the image processing apparatus 1 of this embodiment. When this process is started, in Step S1 the image processing apparatus 1 sets a read resolution. A specific setting method will be later described in detail.

In subsequent Step S2, in accordance with the read resolution set in Step S1, an inspection target image is read. That is, the scanner controller 307 is driven to obtain output signals from the multiple reading elements arrayed on the reading sensor 109, and on the basis of these output signals image data corresponding to the read resolution set in Step S1 is generated. In this embodiment, image data is luminance signals of R (red), G (green), and B (blue).

In Step S3, the CPU 301 sets division sizes and phases to be used for a defect extraction process performed in subsequent Step S4. The definitions of the division size and phase will be later described in detail. In Step S3, at least one type of the division size and phase are set, respectively. In Step 4, on the basis of the division sizes and phases set in Step S3, the defect detection algorithm is performed on the image data generated in Step S2.

Figure 6:
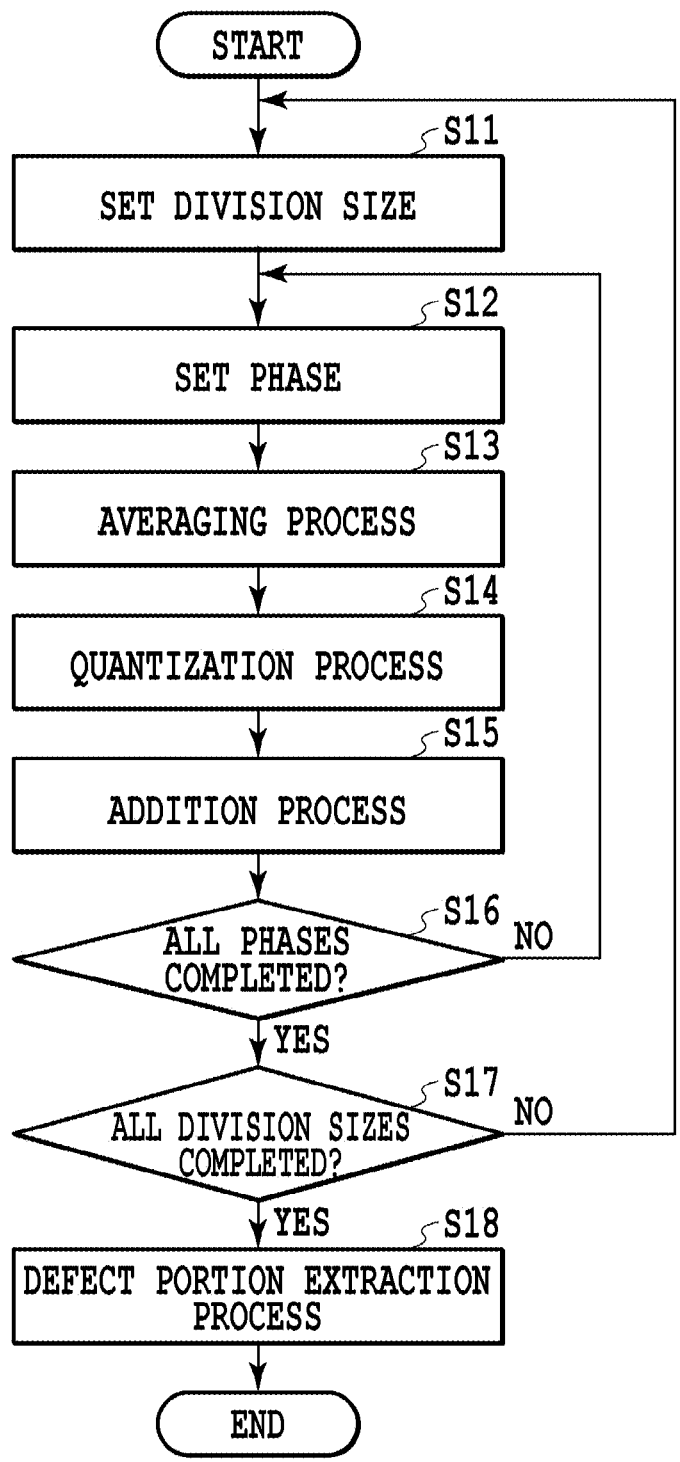
FIG. 6 is a flowchart illustrating a defect detection algorithm according to the first embodiment.

FIG. 6 is a flowchart for explaining the steps of the defect detection algorithm performed by the CPU 301 in Step S4. When this process is started, in Step S11 the CPU 301 first sets one division size from the multiple division sizes set in Step 3. Further, in Step S12, the CPU 301 sets one phase from the multiple phases set in Step S3. In Step S13, on the basis of the division size set in Step S11 and the phase set in Step S12, the image data acquired in Step S2 is divided and an averaging process is performed on the divided image data.

Figure 7A:
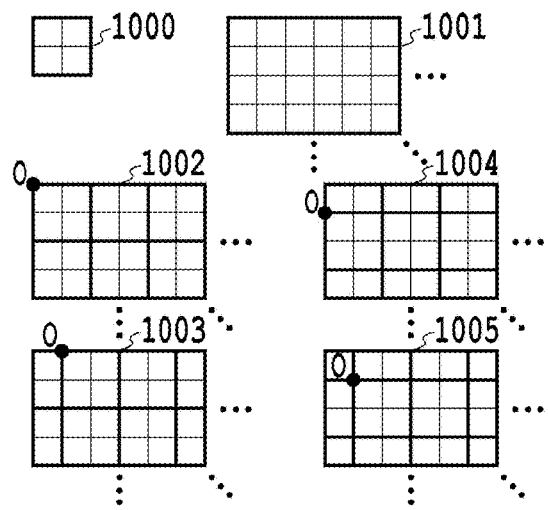
FIGS. 7A to 7C are diagrams for explaining division states of image data.
Figure 7B:
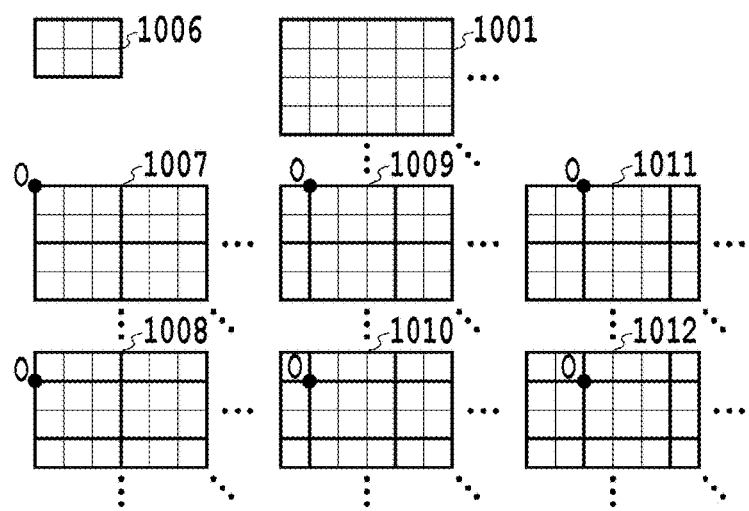
Figure 7C:
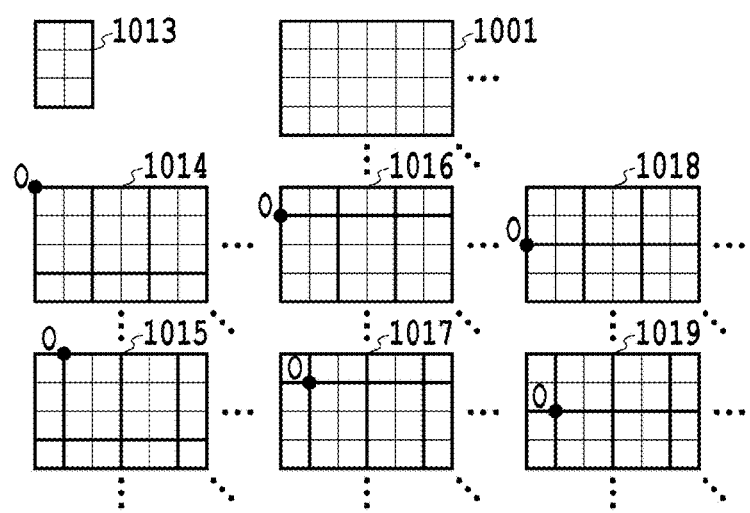

FIGS. 7A to 7C are diagrams for explaining image data division states on the basis of the division sizes and phases. FIG. 7A illustrates the case where the division size is set to 2×2 pixels, FIG. 7B illustrates the case where the division size is set to 3×2 pixels, and FIG. 7C illustrates the case where the division size is set to 2×3 pixels. If a division size 1000 is set to 2×2 pixels as in FIG. 7A, an image data area 1001 is divided on a 2×2 pixel basis and can be divided in four ways as indicated by 1002 to 1005, meaning that four types of corresponding phases are present. In this way, a phase can be considered as corresponding to the origin O of a division size in the image data area 1001. If a division size 1006 is set to 3×2 pixels as illustrated in FIG. 7B, the image data area 1001 can be divided in six ways as indicated by 1007 to 1012, meaning that six types of phases are present. If a division size 1013 is set to 2×3 pixels as illustrated in FIG. 7C, the image data area 1001 can be divided in six ways as indicated by 1014 to 1019, meaning that six types of phases are present.

As a division size is larger, the number of settable phases is also larger. All of the phases may not be necessarily set for one division size. In Step S3 in FIG. 5, at least some of settable phases have only to be set; and in Step S12 in FIG. 6, one of the phases set in Step S3 has only to be set.

Figure 8A:
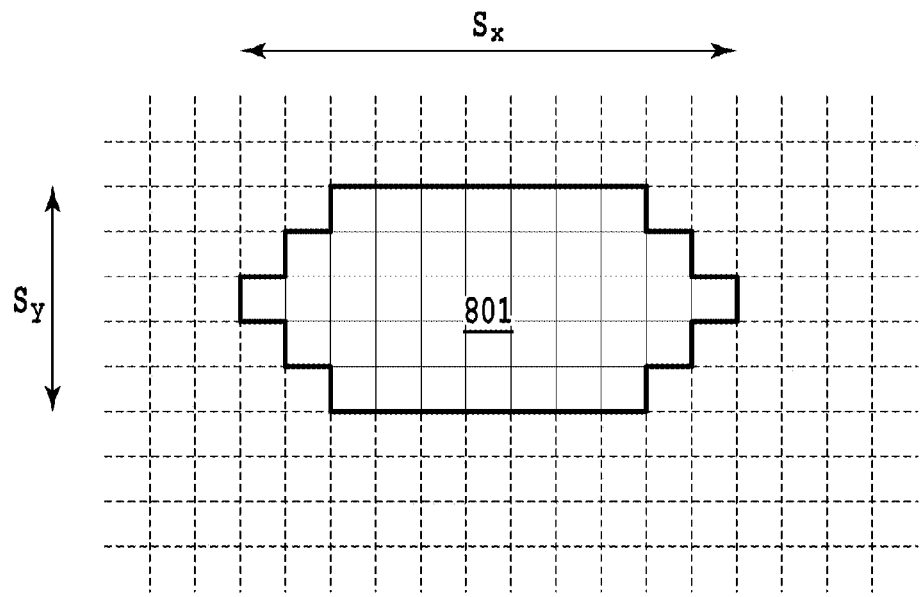
FIGS. 8A and 8B are diagrams for explaining other division shapes.
Figure 8B:
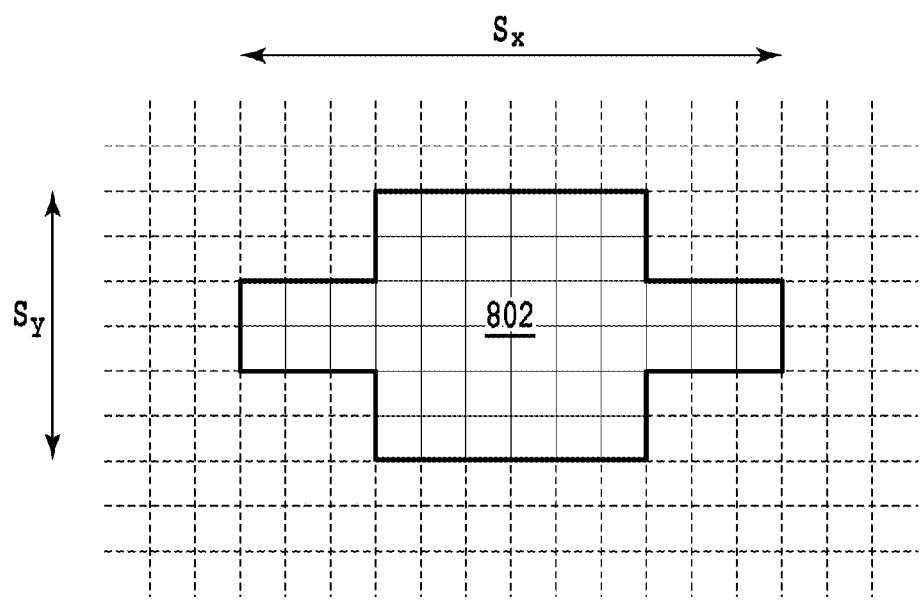

In FIGS. 7A to 7C, the method for dividing image data into squares is described, but image data may be divided into other shapes than square. FIGS. 8A and 8B illustrate other division shapes. Image data may be divided by the shapes illustrated in FIGS. 8A and 8B. That is, as in FIG. 8A, image data may be divided by a division shape 801 including step-like portions, or as in FIG. 8B, image data may be divided by a division shape 802 including bumps. Image data may be divided by a circle. That is, division shapes for dividing image data are not particularly limited. In this embodiment, the case will be described where image data is divided by a rectangular division shape extending in a longitudinal direction of a defect in accordance with the characteristic of occurrence of a detection target defect, which will be later described in detail referring to FIGS. 13A and 13B. However, image data may be divided by other shapes in accordance with other characteristics of a defect or characteristics of the apparatus.

Returning to FIG. 6, in Step S13, the averaging process is performed on each of the division areas resulting from the division in Step S12. Specifically, for multiple pixels included in the division area, an average value of pieces of luminance data of the respective pixels is found. When doing so, the pieces of luminance data corresponding to the respective pixels may be obtained by directly averaging pieces of RGB luminance data of the respective pixels, or by multiplying the pieces of RGB luminance data respectively by predetermined weighting coefficients and then adding the pieces of weighted data. Further, luminance data of one of RGB colors may be directly used as luminance data of the pixel.

In Step S14, the average value calculated in Step S13 is quantized on a pixel basis. The quantization may be binarization or multivalued quantization into several levels. By doing so, quantized data is obtained in the state where quantized values of respective pixels are uniform within each of the division areas.

In Step S15, the quantized values obtained in Step S14 are added to addition image data. The addition image data refers to image data indicating a result of adding pieces of quantized data obtained when variously changing the division size and phase. If the quantized data obtained in Step S14 is based on the initial phase of the initial division size, the addition image data obtained in Step S15 is the same as the quantized data obtained in Step S14.

In subsequent Step S16, the image processing apparatus 1 determines whether or not all the phases have been processed with respect to a currently set division size. If the image processing apparatus 1 determines that a phase to be processed still remains, the flow returns to Step S12 where the next phase is set. On the other hand, if the image processing apparatus 1 determines that all the phases have been processed, the flow proceeds to Step S17.

FIGS. 9A to 9D and FIGS. 10A to 10I are diagrams schematically illustrating the steps in which the addition process in Step S15 is sequentially performed for all the phases in predetermined division sizes. When the division size is set to 2×2 pixels, four different phases are present. In FIGS. 9A to 9D, in the process of sequentially changing the four different phases, for the addition process of a target pixel Px, the number of times of using luminance data of its neighboring pixel is indicated on a pixel basis. When the division size is set to 3×3 pixels, nine different phases are present. In FIGS. 10A to 10I, in the process of sequentially changing the nine different phases, for the addition process of a target pixel Px, the number of times of using luminance data of its neighboring pixel is indicated on a pixel basis.

Figure 9A:
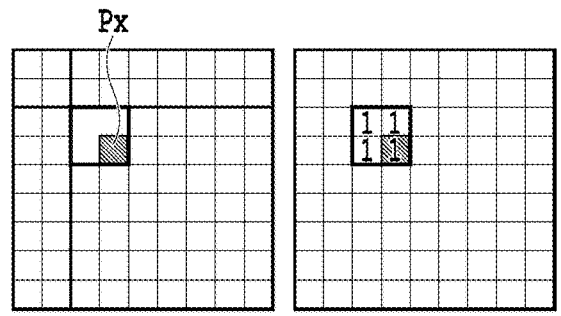
FIGS. 9A to 9E are schematic diagrams illustrating an addition process in a division size of 2×2 pixels.
Figure 9B:
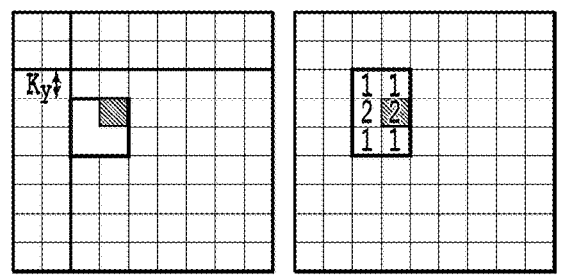
Figure 9C:
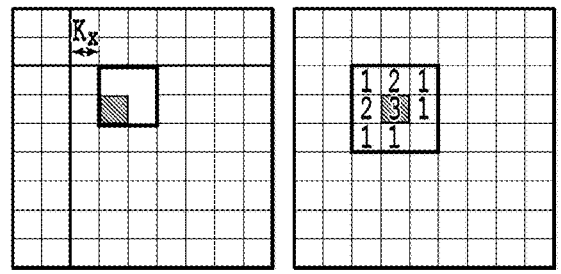
Figure 9D:
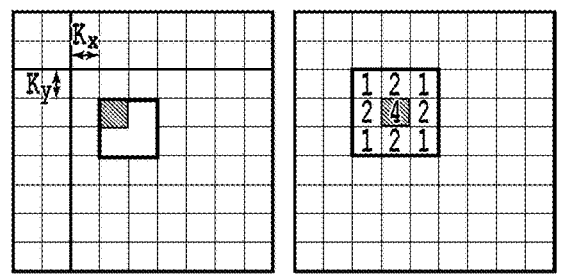
Figure 10A:
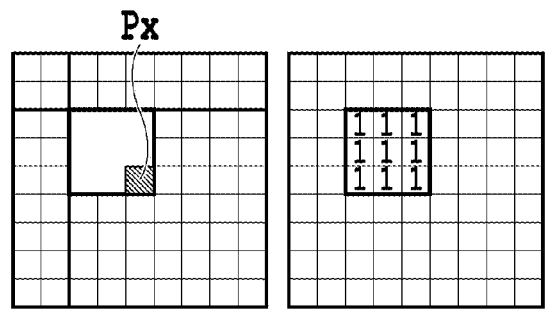
FIGS. 10A to 10j are schematic diagrams illustrating an addition process in a division size of 3×3 pixels.
Figure 10B:
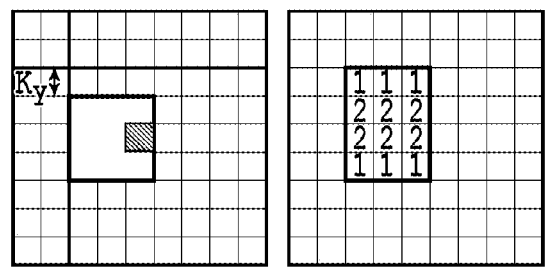
Figure 10C:
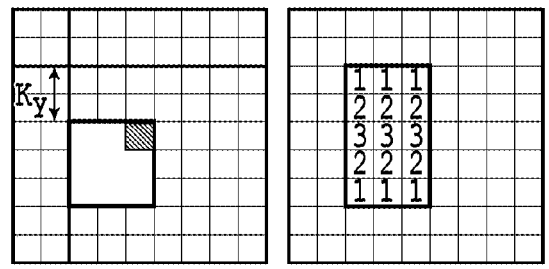
Figure 10D:
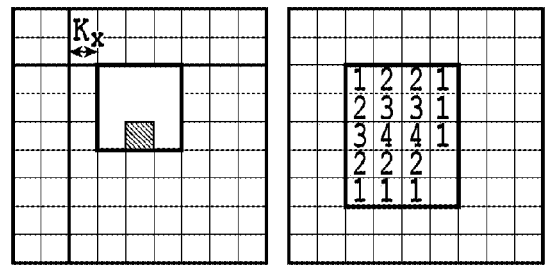
Figure 10E:
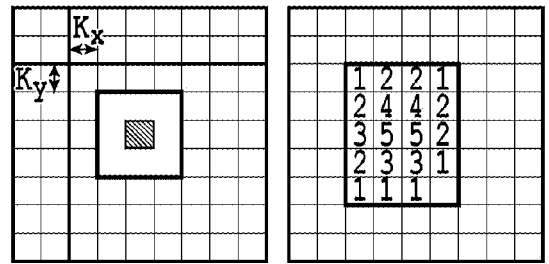
Figure 10F:
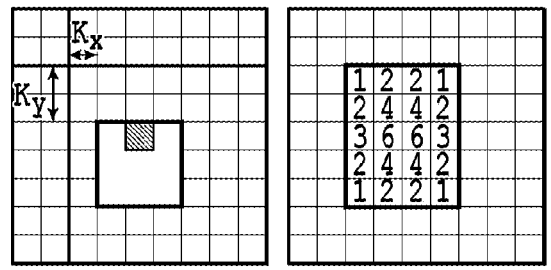
Figure 10G:
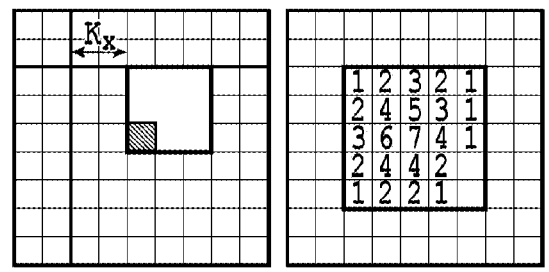
Figure 10H:
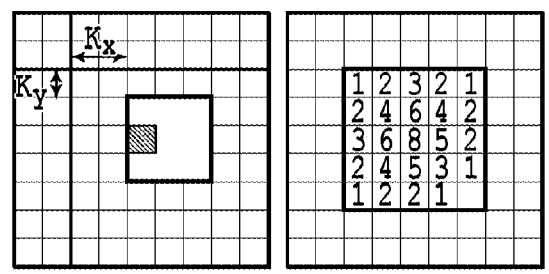
Figure 10I:
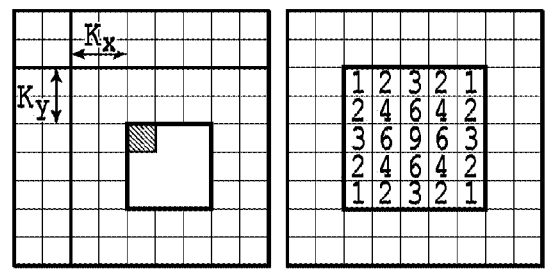

FIGS. 9A and 10A illustrate initial states (initial phases) in which a shift amount (Kx, Ky) is (0, 0). FIGS. 9B to 9D illustrate the states obtained by changing the phase from the initial phase in FIG. 9A. FIGS. 10B to 10I illustrate the states obtained by changing the phase from the initial phase in FIG. 10A. FIGS. 9B and 10B illustrate phases shifted by one pixel in the y direction, whose shift amount (Kx, Ky) is (0, 1). FIGS. 9C and 10D illustrate phases shifted by one pixel in the x direction, whose shift amount (Kx, Ky) is (1, 0). FIGS. 9D and 10E illustrate phases shifted by one pixel in both of the x and y directions, whose shift amount (Kx, Ky) is (1, 1). FIG. 10C illustrates a phase whose shift amount (Kx, Ky) is (0, 2). FIG. 10F illustrates a phase whose shift amount (Kx, Ky) is (1, 2). FIG. 10G illustrates a phase whose shift amount (Kx, Ky) is (2, 0). FIG. 10H illustrates a phase whose shift amount (Kx, Ky) is (2, 1). FIG. 10I is a phase whose shift amount (Kx, Ky) is (2, 2).

Figure 9E:
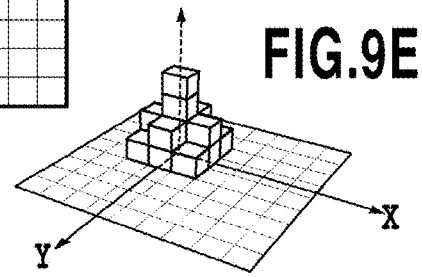
Figure 10J:
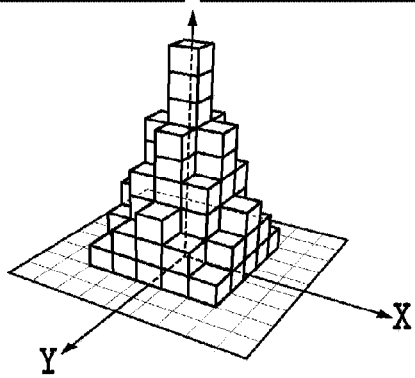

In any of FIGS. 9A to 9D and 10B to 10I, since the target pixel Px is used for all the phases in which the target pixel Px is included in a division area, the target pixel Px has the largest number of additions and has the largest contribution to the addition result. A pixel more distant from the target pixel Px has the smaller number of additions, and has a smaller contribution to the addition result. That is, by changing the phase, ultimately a result is obtained such that a filtering process is performed with the target pixel as the center, as illustrated in FIGS. 9E and 10J.

Returning to the flowchart in FIG. 6, in Step S17 the image processing apparatus 1 determines whether or not all the division sizes set in Step S3 in FIG. 5 have been processed. If the image processing apparatus 1 determines that a division size to be processed still remains, the flow returns to Step S11 where the next division size is set. On the other hand, if the image processing apparatus 1 determines that all the division sizes have been processed, the flow proceeds to Step S18.

In Step S18, a defect portion (unique portion) extraction process is performed on the basis of currently obtained addition image data. In this process, a portion where a variation in signal value is large in comparison with its surrounding luminance data is extracted as a defect portion. A method of an extraction process is not particularly limited to this, and a publicly known determination process can be used. This process ends here.

The defect detection algorithm described with FIG. 6 calculates addition data on the basis of average values of all pixels included in division areas that shift around the target pixel Px as described with FIGS. 9A to 9E and FIGS. 10A to 10J. For this reason, a target pixel positioned in an end part of print image data may not be properly processed because the division area includes an area where no data is present. In order to deal with such a situation, in this embodiment, dummy image data is preliminarily attached around inspection target image data.

Figure 11A:
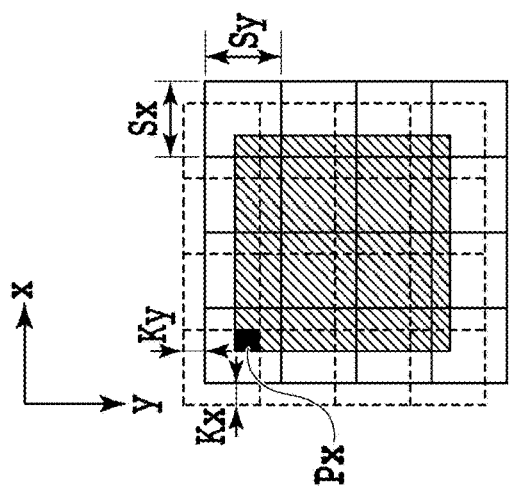
FIGS. 11A to 11C are diagrams for explaining a method for generating dummy data.
Figure 11B:
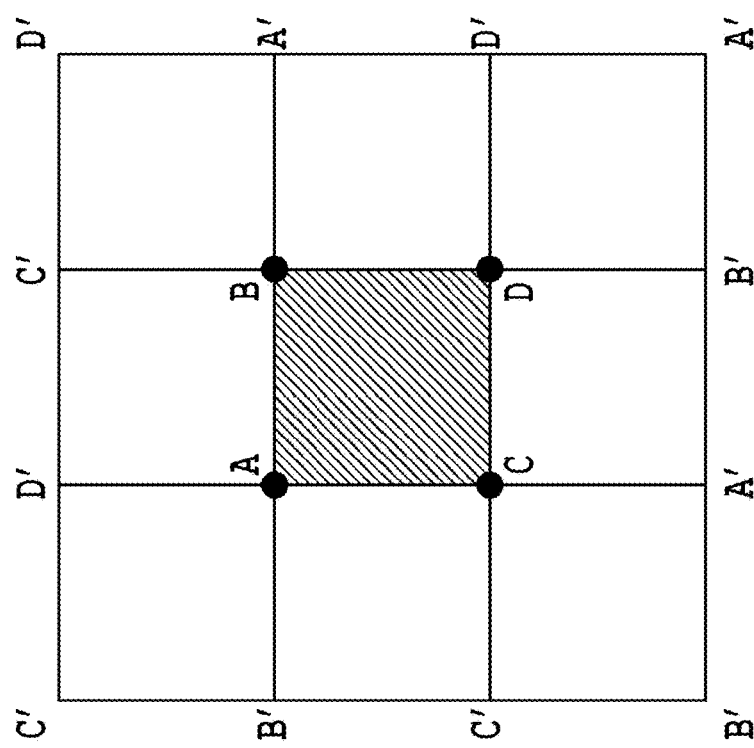
Figure 11C:
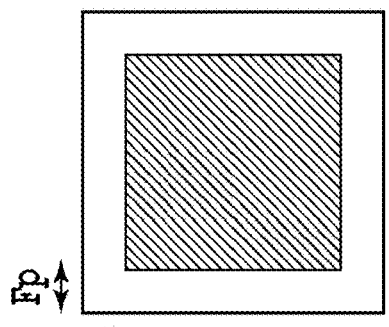

FIGS. 11A to 11C are diagrams for explaining a method for generating dummy data. In the diagrams, an area corresponding to inspection target image data is indicated as a shaded area. As illustrated in FIG. 11A, if a target pixel Px indicated in black is positioned at a corner of an inspection target area, both of a division area (solid line) around the target pixel Px, and a division area (dashed line) whose phase has been shifted from the division area (solid line) include areas (white areas) where no data is present. For this reason, in this embodiment, dummy data is generated such that even if the maximum division size and the maximum shift distance are employed with respect to the target pixel Px, appropriate data is present in any pixel included in any division area.

FIG. 11B is a diagram illustrating a method for generating dummy data. Four images obtained by inverting inspection target image data point-symmetrically with respect to apices A, B, C, and D, respectively, and four images obtained by inverting the inspection target image data line-symmetrically with respect to sides AB, BD, CD, and AC, respectively are generated, and these eight images surround the inspection target image data. Note that the maximum division size and the maximum shift distance in the defect detection algorithm are represented by (Sxm, Sym) and (Kxm, and Kym), respectively. In this case, the dummy data is only required to be generated in an area that is extended from the four edges of the inspection target image data by $Fp=(Sxm/2)+Kxm$ in the X direction and by $Fq=(Sym/2)+Kym$ in the Y direction. FIG. 11C illustrates inspection target image data that is added with the dummy data in this manner.

As a fourth embodiment, which will be described later, when inspection target image data is generated using a Gaussian filter, Fp and Fq defining the size of dummy data are given as $Fp=INT(Fxm/2)$, and $Fq=INT(Fym/2)$. Here, Fxm and Fym represent x and y components, respectively, of the maximum Gaussian filter size F used in the defect detection algorithm. When the defect portion extraction process is performed on a portion of print image data, in some cases dummy data may not be added to the inspection target image data. If a target pixel is not positioned in an edge portion of the print image data, dummy data may not be generated.

Information on a defect portion extracted in accordance with the above algorithm can be used later for various applications. For example, in defect inspection of an image, an inspector can display the defect portion as a popup in order to make the defect portion easily determinable. In this case, the inspector can check the defect portion on the basis of the image displayed as a popup, and repair or eliminate the defect portion as a defective image. Such image defect inspection is considered to be performed in order to inspect a print state of a printing apparatus when the printing apparatus is developed, manufactured, or used.

Information on a defect portion can also be stored for use in another system. Further, a device having a self-correcting function of a defect to a normal state can be configured to be capable of using information on a defect portion for a correction process. For example, when an area where luminance is higher or lower as compared with surrounding areas is extracted, an image processing parameter for correction can be prepared for the area. In addition, it is also possible to detect an ejection state of the inkjet printing apparatus, and perform a maintenance action on the print head for a printing element at a relevant position.

In any case, when the above defect detection algorithm is employed, since a defect portion is extracted on the basis of addition of pieces of quantized data obtained by variously changing the division size and phase, a substantial defect can be made apparent while appropriately suppressing noise of each read pixel.

The present inventors have found, as the results of earnest examination, that if features of a detection target defect is clear, it is effective to adjust a division size and a phase in reading an inspection image in accordance with the features in the above defect detection algorithm. In other words, if a division size and a phase are not set to be in suitable ranges, it is possible that a defect portion cannot be effectively detected, or that a load and time for the process of extraction process is unnecessarily increased. For this reason, in this embodiment, taking into consideration features of a detection target defect, a division size and a phase are set according to the features in Step S3 of the flowchart in FIG. 5. In the following, the relation between the features of a detection target defect in this embodiment and a division size and a phase suitable for the features will be specifically described.

Figure 12A:
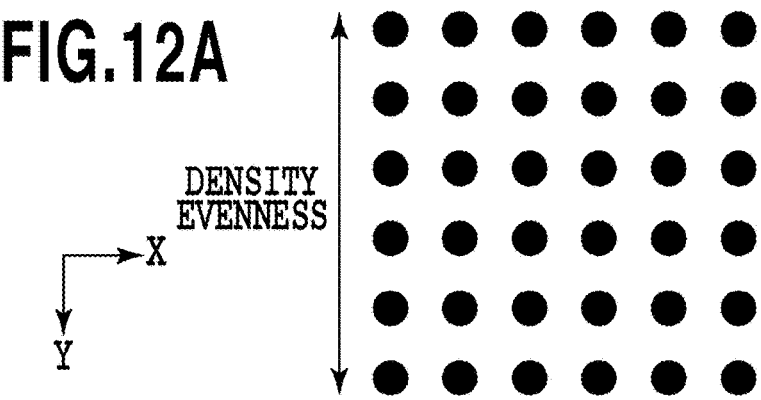
FIGS. 12A to 12C are diagrams for explaining density unevenness.
Figure 12B:
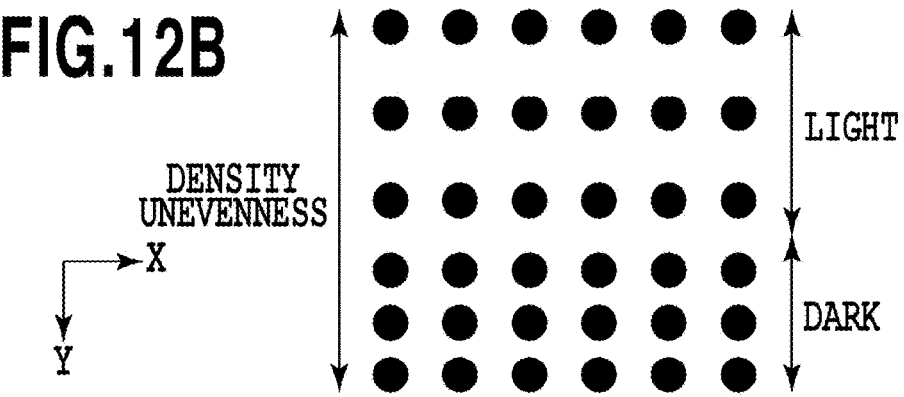
Figure 12C:
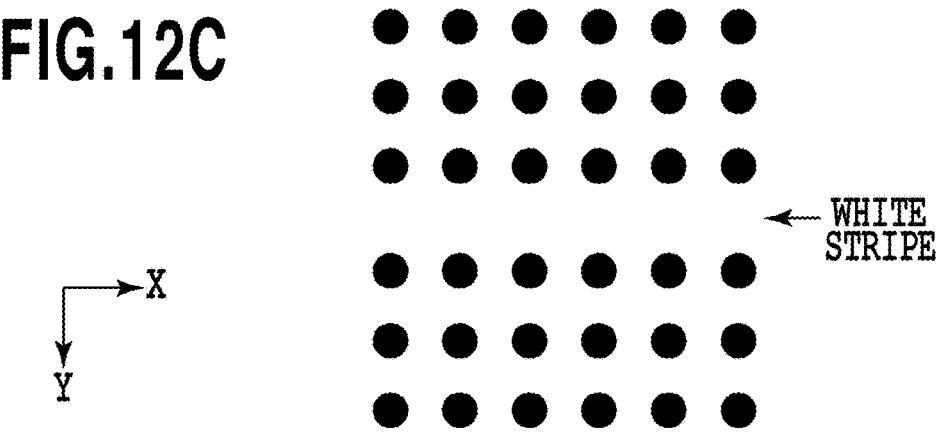

In this embodiment, the case where a detection target defect is a density unevenness will be described. FIGS. 12A to 12C are diagrams for explaining density unevenness in a printing apparatus. Black circles in FIGS. 12A to 12C indicate dots formed by ink droplets applied to the sheet P. FIG. 12A depicts the case where ink is applied to desired positions and no density unevenness occurs, and FIGS. 12B and 12C depict the cases where ink is applied to positions deviated from desired positions and density unevenness occurs. When dots are uniformly arranged as illustrated in FIG. 12A, no density unevenness occurs. On the other hand, when both of an area where a distance between dots is relatively narrow and an area where a distance between dots is relatively wide are present as illustrated in FIG. 12B, density unevenness occurs due to a difference in dot density between the both areas. When dots are arranged at regular intervals and an area without a dot is partially present as illustrated in FIG. 12C, density unevenness (a white stripe) occurs. Such a density unevenness occurs due to a change in conveyance speed of the sheet P, a difference in ejection characteristics among printing elements, or an arrangement error in printing element arrays. Here, the case will be described where a stripe-like density unevenness extending in the X direction that occurs due to a change in conveyance speed of the sheet P is a detection target.

Figure 13A:
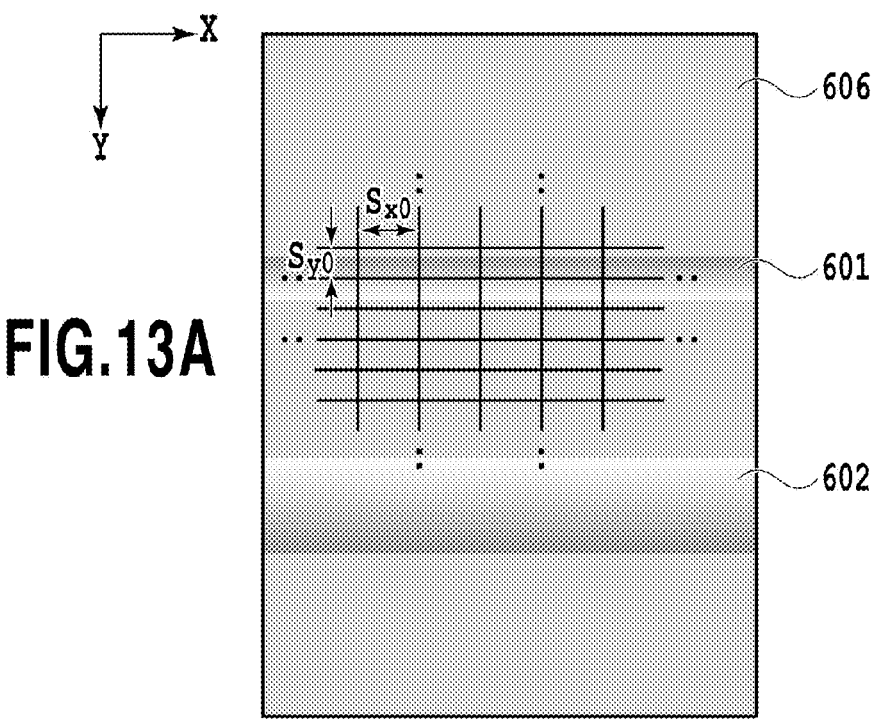
FIGS. 13A and 13B are diagrams illustrating density unevenness and division sizes.
Figure 13B:
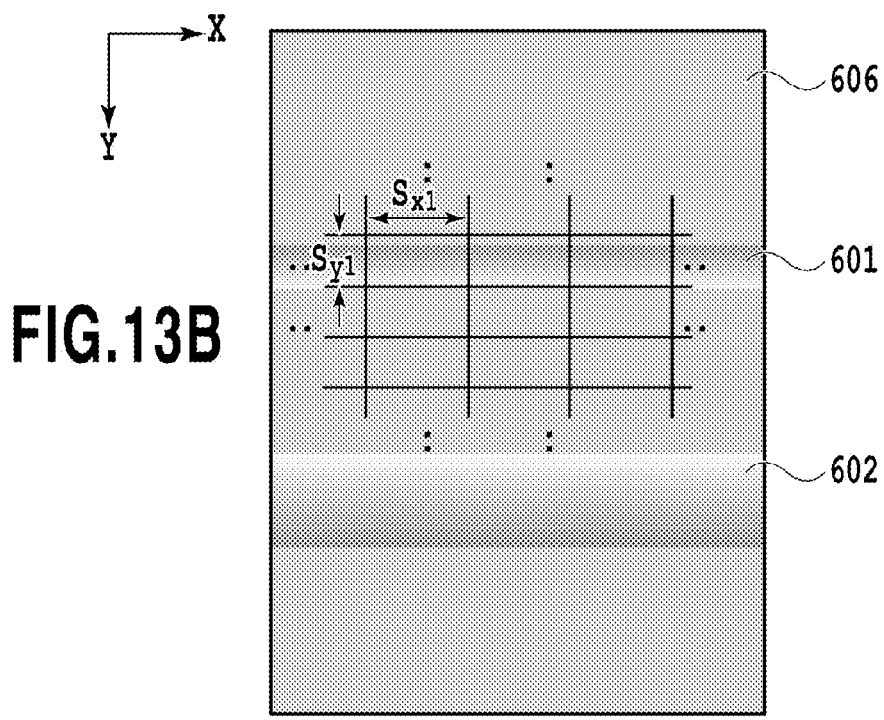

FIGS. 13A and 13B are schematic diagrams illustrating image data 606 read in Step S2 in FIG. 5. Density unevenness areas 601, 602 in FIGS. 13A and 13B illustrate areas where a density unevenness occurs. As described above, here, when the density unevenness areas 601, 602 extending in the X direction occur, image data is divided by a division size wider in X direction than in Y direction. That is, as illustrated in FIGS. 13A and 13B, a division size is set to Sx>Sy. By doing so, the proportion of a defect portion relative to a division area where the defect portion is present is relatively larger, which relatively increase a difference in luminance data value between this division area and other areas when the averaging process in Step S13 of FIG. 6 is performed. This enables a defect to be efficiently extracted by determining an area much different from surrounding areas as a defect portion.

In doing so, if a shift amount is set to Kx>Ky, a defect can be extracted more effectively. For example, a shift amount in the X direction is set to −10≤Kx≤10 and a shift amount in the Y direction is set to −5≤Ky≤5. As a result, since additions of average values in luminance data in the X direction increase, a density unevenness due to a conveyance error of the sheet P can be extracted more efficiently.

Here, although the case where a division size of Sx>Sy is set has been described, the same effect can be also obtained if image data is divided by a division size of Sx=Sy and a shift amount is set to Kx>Ky. That is, when a density unevenness extending in the X direction is a detection target, by setting a division size and a shift amount so as to satisfy the relation Sx+Kx>Sy+Ky, an efficiency of extracting a defect can be improved.

Here, on the basis of a type and characteristics of the apparatus, it is preliminarily determined that a density unevenness extending in the X direction is a detection target, and it is preliminarily set that an aspect ratio of a division size is Sx>Sy. That is, a density unevenness in which extending direction should be extracted as a defect portion is preliminarily determined, and a division size is set such that this determined extending direction is a longitudinal direction.

FIG. 13A schematically illustrates the case where the image data 606 is divided by a division size $(Sx_0, Sy_0)$. FIG. 13B schematically illustrates the case where the image data is divided by a division size $(Sx_1, Sy_1)$ larger than the division size $(Sx_0, Sy_0)$ in FIG. 13A.

For example, when a division size is set from Expression 1, two times of changes of the division size can process an area twice the size of an area of two times before.

$$(S_{xn+1}, S_{yn+1}) = (\sqrt{2} \times 2_{xn}, \sqrt{2} \times S_{yn}) \quad n=0,1,2 \qquad \text{Expression 1}$$

In addition, a division size may be enlarged by one and half times. A change amount in size in the X direction may be different from a change amount in size in the Y direction.

Figure 14A:
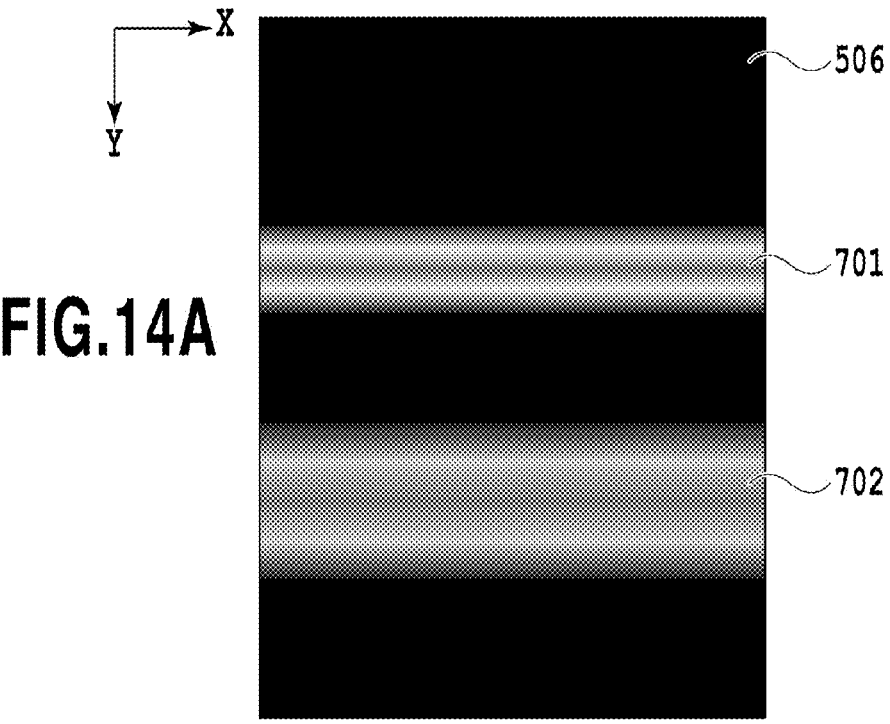
FIGS. 14A and 14B are diagrams illustrating defect extraction results.
Figure 14B:
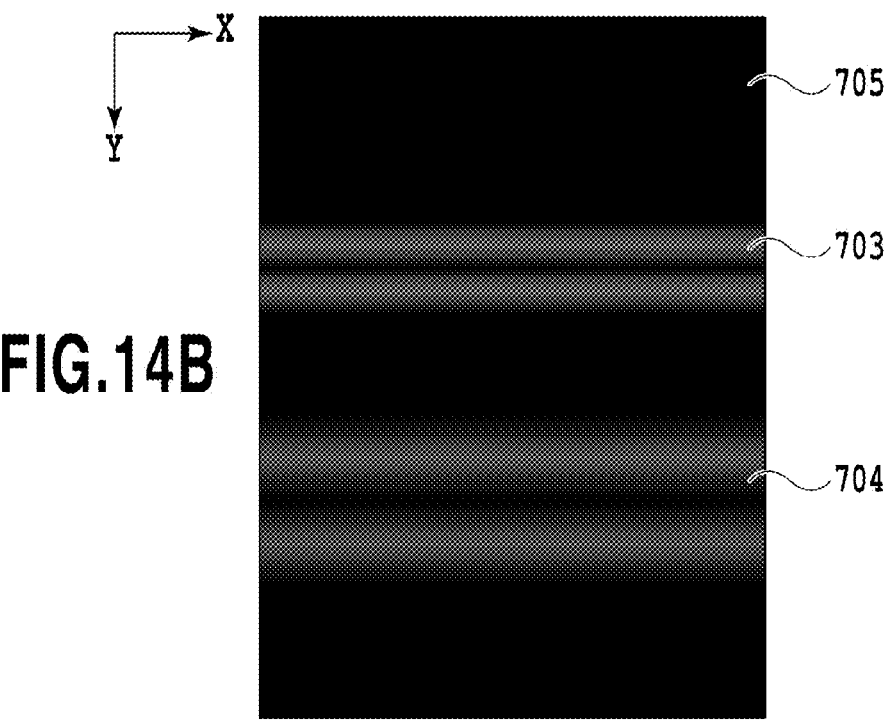

FIGS. 14A and 14B illustrate results of performing the defect portion extraction process in Step S18 of FIG. 6 on density unevenness extending in the X direction in FIGS. 13A and 13B. In FIGS. 14A and 14B, an area whose difference in luminance data value relative to surrounding areas is relatively large is presented white as a relatively high luminance, and an area whose difference in luminance data value relative to surrounding areas is relatively small is presented black as a relatively low luminance.

FIG. 14A illustrates data 506 resulting from performing the defect portion extraction process in Step S18 of FIG. 6 when a division size and a shift amount are set so as to have the relation Sx+Kx>Sy+Ky. As described above, when the division size and shift amount are set to Sx+Kx>Sy+Ky, a difference in luminance data value between a division area corresponding to a defective area and a division area not corresponding to a defective area is relatively large. Accordingly, as illustrated in FIG. 14A, the data 506 resulting from the defect portion extraction process is data in which a white portion and a black portion can be clearly differentiated from each other, i.e., data in which defect portions 701, 702 are rightly extracted.

FIG. 14B illustrates data 705 resulting from performing the defect portion extraction process in Step S18 of FIG. 6 when a division size and a shift amount are set so as to have the relation Sx+Kx≤Sy+Ky. In FIG. 14B, since the division size and shift amount are set so as to be the relation Sx+Kx≤Sy+Ky, the proportion of a defective area relative to a division area where the defective area is present is relatively small. Accordingly, a difference in luminance data value between a division area corresponding to a defective area and a division area not corresponding to a defective area is small, and therefore as illustrated in FIG. 14B, in the resulting data, a white portion and a black portion cannot be clearly distinguished from each other. In this case, defect portions 703, 704 cannot be rightly extracted.

As obvious from comparing FIGS. 14A and 14B, here, when a density unevenness extending in the X direction is a detection target, by setting a division size and a shift amount so as to satisfy the relation Sx+Kx>Sy+Ky, the density unevenness can be rightly extracted. In this way, here, a division size is set such that a size in an array direction of printing elements is larger than a size in the direction crossing the array direction of printing elements, and/or a shift amount is set such that a shift amount in the array direction is larger than a shift amount in the crossing direction. This enables a density unevenness occurring in the array direction of printing elements to be rightly extracted.

Second Embodiment

Figure 15:
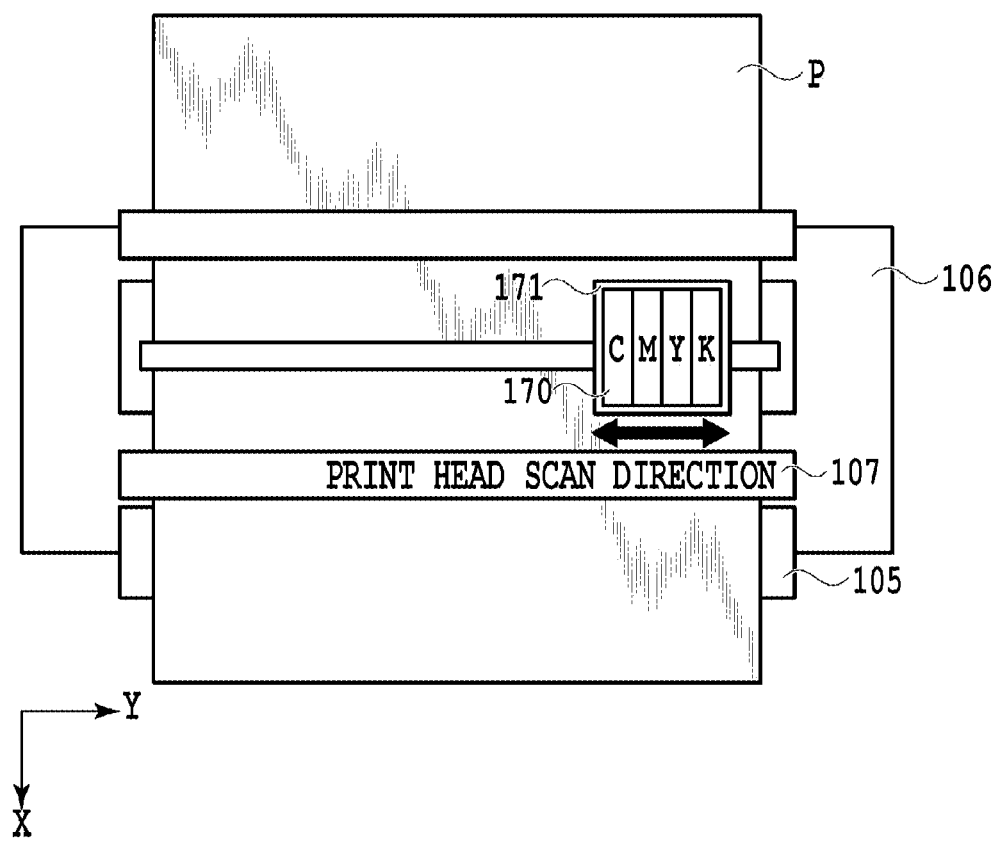
FIG. 15 is a schematic configuration diagram of a serial-type inkjet printing apparatus according to a second embodiment.

In this embodiment, the case where a serial-type inkjet printing apparatus is used will be described. FIG. 15 is a schematic configuration diagram of a serial-type inkjet printing apparatus. In FIG. 15, a print head 170 mounted on a carriage 171 reciprocates along with the carriage 171 in the Y direction in FIG. 15, and during this reciprocation an unillustrated printing element array eject black (K), cyan (c), magenta (M), yellow (Y) inks. After one print scan, the sheet P is conveyed in the X direction by a distance matching a print width of the print head 170. Such a print scan and conveyance action are alternately repeated thereby to generate an image on the sheet P. In each printing element array, multiple printing elements are arrayed in the X direction. In the read head 107, multiple reading elements are arrayed in the Y direction.

In the serial-type inkjet printing apparatus as illustrated in FIG. 15, when the movement speed of the carriage 171 changes, a density unevenness extending in the X direction may occur. If the read head 107 attempts to read such a density unevenness, the extending direction (X direction) of the density unevenness crosses the array direction (Y direction) of reading elements. Accordingly, when a read resolution in the X direction is set in Step S1 of FIG. 5, the read resolution can be adjusted by changing read frequencies of respective reading elements in this case.

As another form, the configuration can be employed in which a shorter read head composed of reading elements arrayed in the X direction is provided in parallel with the print head 170 and at a side of the carriage 171. In this case, a reading action is performed, as with a printing action, by performing multiple times of scans on the sheet, and the extending direction of a density unevenness is the same as the array direction of reading elements. That is, a read resolution can be adjusted in the method described in the above embodiment.

In this embodiment, as just described, even if a defect extending in the same direction as the array direction of reading elements is detected, or even if a defect extending in the direction crossing the array direction of reading elements is detected, a resolution of read pixels can be adjusted to a suitable amount.

Further, as illustrated in FIGS. 1A and 1B, when an image printed by a printing apparatus is read by a reading apparatus different from the printing apparatus, a read resolution can be further adjusted by various methods. For example, in the configuration in which a sheet is placed on a flat-plate reading table and a whole image is imaged by an area sensor at the same time, a read resolution can be adjusted by changing a magnification M of an optical system. In this case, concepts of the array direction and reading direction of reading elements can be practically ignored.

Figure 16:
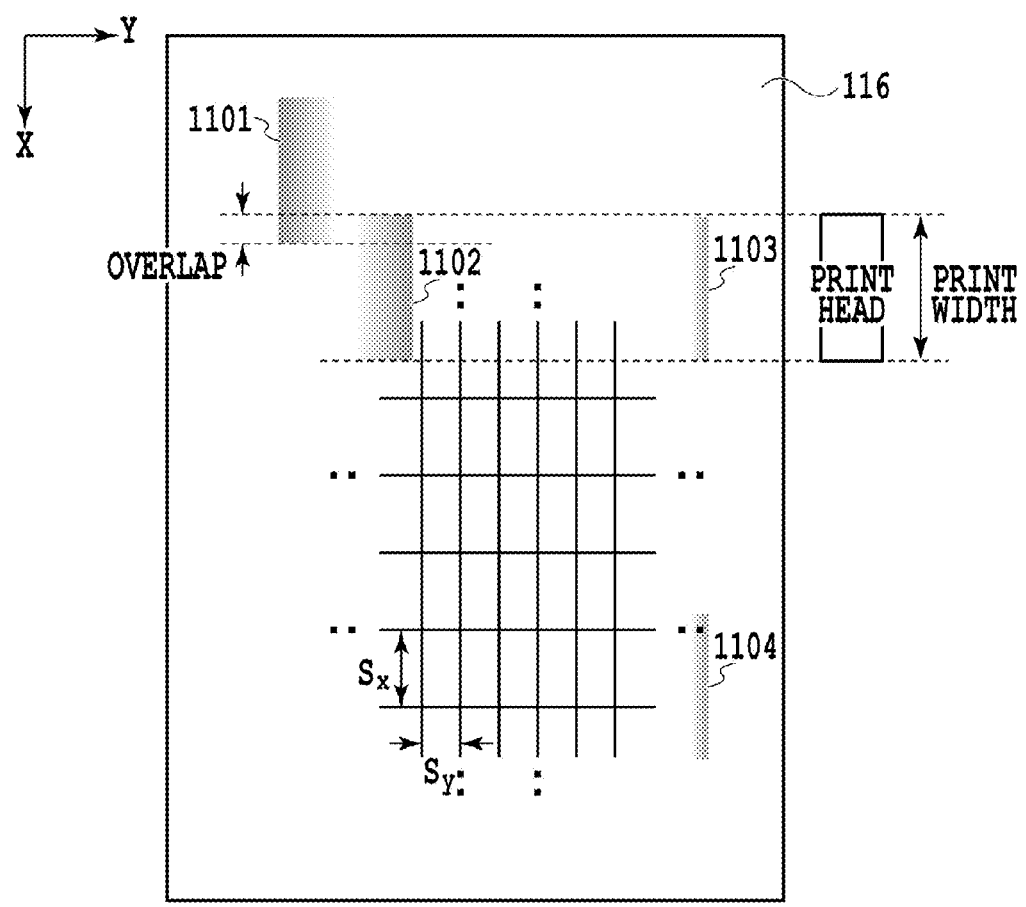
FIG. 16 is a schematic diagram illustrating density unevenness and division sizes.

FIG. 16 is a schematic diagram illustrating image data 116 read in Step S2 of FIG. 5. Density unevenness areas 1101 to 1104 illustrated in FIG. 16 indicate areas where a density unevenness occurs. FIG. 16 illustrates density unevenness due to a change in movement speed of the carriage 171. For example, if the movement speed temporarily decreases during movement of the carriage 171, then in an area corresponding to the movement speed decrease, a distance between dots are narrower than other areas, causing a density unevenness. On the other hand, for example, if the movement speed of the carriage 171 temporarily increases, then in an area corresponding to the movement speed increase, a distance between dots are wider than other areas, causing a density unevenness. Such a density unevenness due to a change in movement speed of the carriage 171 extends in the X direction as illustrated in FIG. 16. If the sheet P is conveyed by a distance shorter than a distance matching a print width of the print head 170 during printing, an area where a density unevenness in a scan and a density unevenness in the subsequent scan overlap may occur. FIG. 16 also illustrates the case of occurrence of an area where the density unevenness area 1101 and the density unevenness area 1102 overlap.

When a density unevenness extending in the X direction as illustrated in FIG. 16 is a detection target, here, image data is divided by a division size wider in the X direction than in the Y direction. That is, as illustrated in FIG. 16, a division size of Sx>Sy is set. Further, a size in the X direction of the division size is set to be less than or equal to a print width of the print head 170. If a division size of Sx>Sy is set in this way, by setting a shift amount to Kx>Ky a defect can be more effectively extracted.

Even if image data is divided by a division size of Sx=Sy and a division area is shifted by a shift amount of Kx>Ky, the same effect can be obtained. That is, by setting a division size and a shift amount so as to satisfy the relation Sx+Kx>Sy+Ky, an efficiency of extracting a defect can be improved.

Figure 17A:
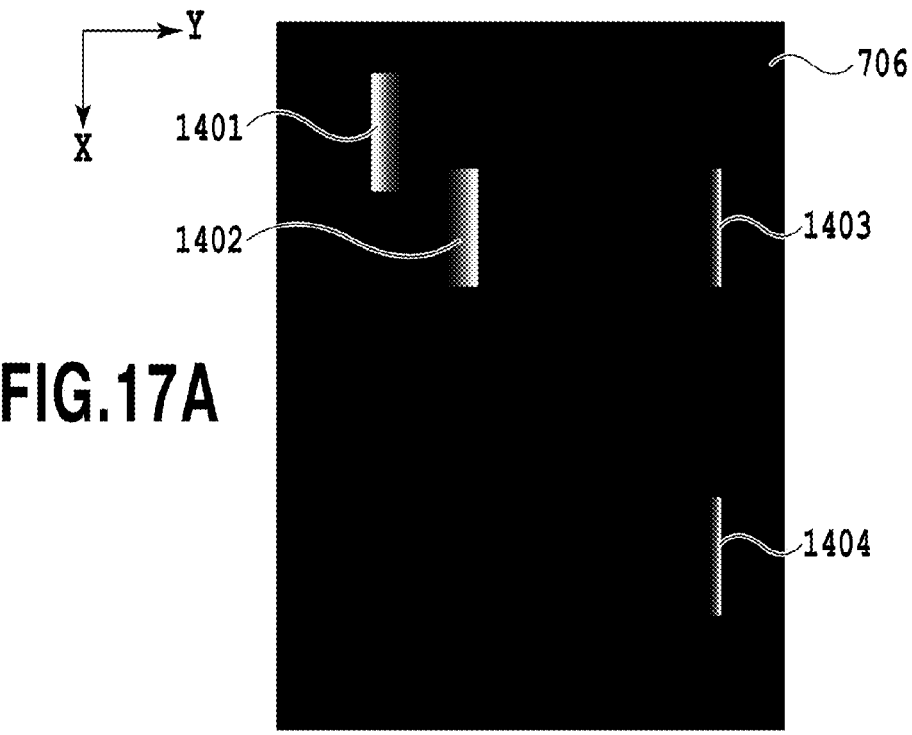
FIGS. 17A and 17B are diagrams illustrating defect extraction results.
Figure 17B:
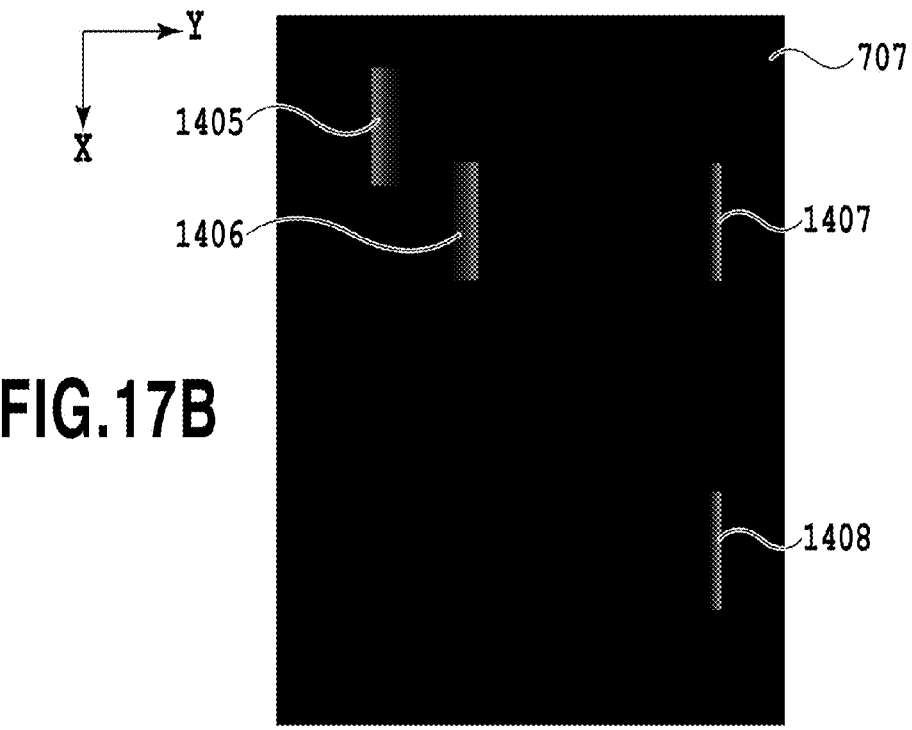

FIGS. 17A and 17B illustrate results of performing the defect portion extraction process in Step S18 of FIG. 6 on density unevenness extending in the X direction illustrated in FIG. 16. Also in FIGS. 17A and 17B, as with FIGS. 14A and 14B, an area whose difference in luminance data value relative to surrounding areas is relatively large is presented white, and an area whose difference in luminance data value relative to surrounding areas is relatively small is presented black.

FIG. 17A illustrates data 706 resulting from performing the defect portion extraction process in Step S18 of FIG. 6 when a division size and a shift amount are set to satisfy the relation Sx+Kx>Sy+Ky. As described above, when a density unevenness extending in the X direction occurs, if a division size and a shift amount are set to Sx+Kx>Sy+Ky, then a difference in luminance data vale between a division area corresponding to a defective area and other division areas is relatively large. Accordingly, as illustrated in FIG. 17A, the data 706 obtained by the defect portion extraction process is data in which defect portions 1401 to 1404 are rightly extracted.

FIG. 17B illustrates data 707 resulting from performing the defect portion extraction process in Step S18 of FIG. 6 when a division size and a phase are set to satisfy the relation Sx+Kx≤Sy+Ky. In FIG. 17B, since a division size and a phase are set to satisfy the relation Sx+Kx≤Sy+Ky, a difference in proportion of a defective area relative to a division area where the defective area is present is relatively small among the respective division areas. For this reason, a difference in luminance data value between a division area corresponding to a defective area and other division areas is small, and therefore defect portions 1405 to 1408 cannot be rightly extracted as illustrated FIG. 17B.

As obvious from comparing FIGS. 17A and 17B, also here, by setting a division size and a shift amount so as to satisfy the relation Sx+Kx>Sy+Ky, a density unevenness can be rightly extracted.

Third Embodiment

In this embodiment, a defect extraction method in the case where density unevenness having different extending directions occur at the same time will be described. More specifically, the case will be described where a change in conveyance speed of the sheet P described with FIG. 13A and a change in movement speed of the carriage 171 described with FIG. 16 occur at the same time when the serial-type inkjet printing apparatus illustrated in FIG. 15 is used.

When a change in conveyance speed of the sheet P and a change in movement speed of the carriage 171 occur at the same time, both of the density unevenness illustrated in FIG. 13A and the density unevenness illustrated in FIG. 16 occur at the same time. In this case, in Step S3 of FIG. 5 a division size and a shift amount are set to satisfy the relation Sx+Kx>Sy+Ky and the detect extraction process illustrated in FIG. 6 is performed. After that, in Step S3 of FIG. 5, a division size and a shift amount are set to satisfy the relation Sx+Kx<Sy+Ky and the detect extraction process illustrated in FIG. 6 is performed. By synthesizing the results of the respective processes, both of the density unevenness extending in the X direction and the density unevenness extending in the Y direction are rightly extracted. Here, a division size and a shift amount are set to satisfy the relation Sx+Kx>Sy+Ky and the detect extraction process is performed, and after that, a division size and a shift amount are set to satisfy the relation Sx+Kx<Sy+Ky, and the detect extraction process is performed. However, the order of these processes is not particularly limited.

Here, it is preliminarily determined that a density unevenness extending in any direction is a detection target according to, for example, a type of the apparatus, and it is preliminarily set that the detect extraction process in Sx+Kx>Sy+Ky and the detect extraction process in Sx+Kx<Sy+Ky are performed.

When both of the density unevenness illustrated in FIG. 13A and the density unevenness illustrated in FIG. 16 occur, if a division size and a shift amount are set to be Sx+Kx>Sy+Ky and an extraction process is performed, then the process result is synthesis of the data 705 illustrated in FIG. 14B and the data 706 illustrated in FIG. 17A. When both of the density unevenness illustrated in FIG. 13A and the density unevenness illustrated in FIG. 16 occur, if a division size and a phase is set to Sx+Kx<Sy+Ky and an extraction process is performed, then the process result is synthesis of the data 506 illustrated in FIG. 14A and the data 707 illustrated in FIG. 17B. Data resulting from synthesizing these results is illustrated in FIG. 18.

Figure 18:
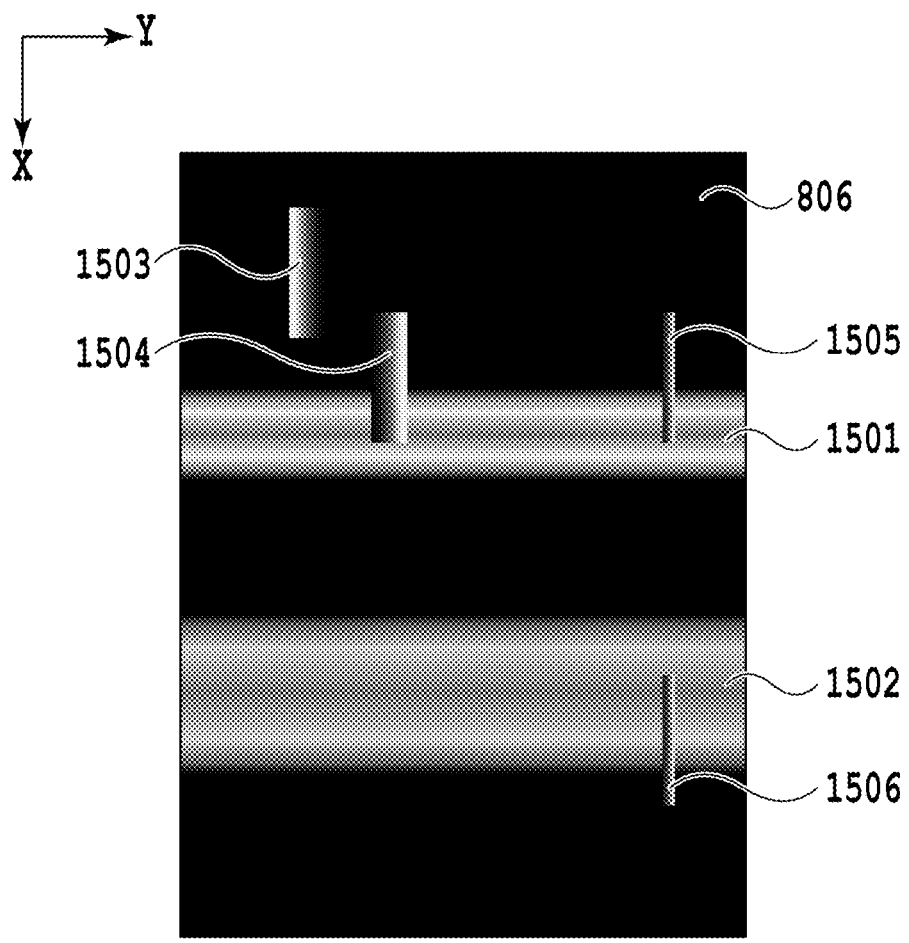
FIG. 18 is a diagram illustrating a defect extraction result according to a third embodiment.

FIG. 18 illustrates a result obtained by performing the defect portion extraction process in Step S18 of FIG. 6 on each of the density unevenness extending in the X direction and the density unevenness extending in the Y direction and synthesizing their process results. As illustrated in FIG. 18, defect portions 1501, 1502 extending in the Y direction and defect portions 1503 to 1506 extending in the X direction have been extracted such that they are clearly distinguished from other areas.

In this way, here, even when both of the density unevenness extending in the X direction and the density unevenness extending in the Y direction occur, a division size and a shift amount are set according to the characteristics of occurrence of the density unevenness. This enables density unevenness as defect portions to be rightly extracted.

Here, the case has been described where density unevenness extending in the X and Y directions are extracted as defect portions in the serial-type inkjet printing apparatus. However, even if density unevenness having different extending directions occur at the same time in a full-line type inkjet printing apparatus, the density unevenness can be rightly extracted by performing the same processes.

Fourth Embodiment

In the first embodiment, as described with the flowchart in FIG. 6, the process is performed for finding an addition result of average values for multiple phases corresponding to a division size. By such a process, as described with FIGS. 9E and 10J, ultimately a result is obtained such that a filtering process is performed with a target pixel as the center. In consideration of such a respect, this embodiment is adapted to replace the addition process for multiple phases corresponding to one division size by an addition process of weighting coefficients using a Gaussian filter. Other configurations are the same as the above embodiment, and will not be described here.

Figure 19A:
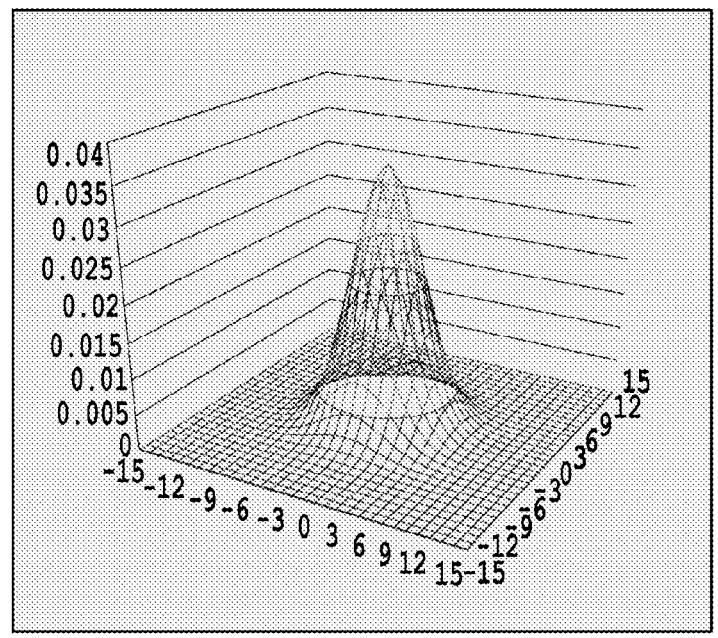
FIGS. 19A and 19B are diagrams illustrating examples of Gaussian filters.
Figure 19B:
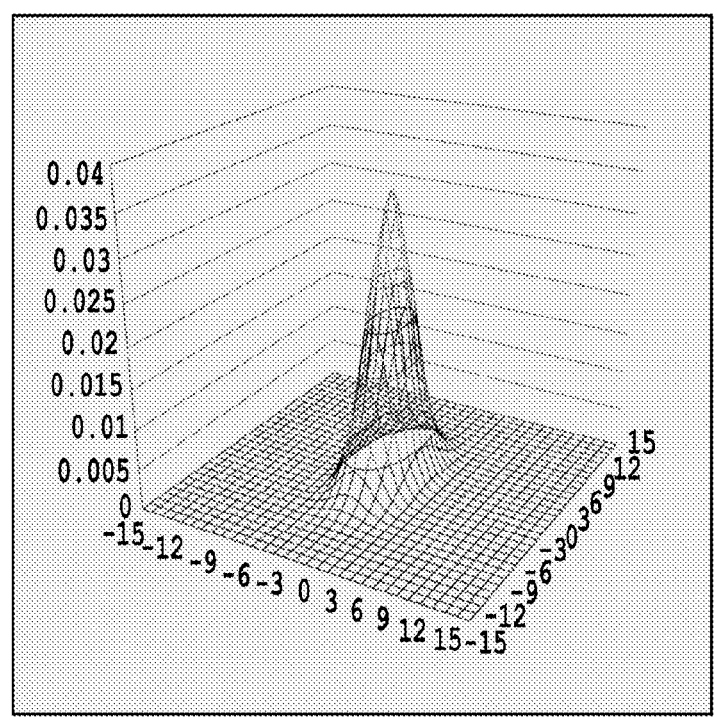

FIGS. 19A and 19B are diagrams illustrating examples of Gaussian filters. FIG. 19A illustrates an isotropic Gaussian filter, which can be expressed by Expression 2.

$$f(x, y) = \frac{1}{2\pi\sigma^2} \exp\left(-\frac{x^2 + y^2}{2\sigma^2}\right) \qquad \text{Expression 2}$$

Here, σ represents a standard deviation.

Such an isotropic Gaussian filter corresponds to the case of using a square division size such as 2×2 or 3×3.

On the other hand, FIG. 19B illustrates an anisotropic Gaussian filter, and corresponds to the case of using a rectangular division size such as 2×3 or 3×2. Such an anisotropic Gaussian filter can be generated by deviating the ratio between x and y in Expression 2. For example, the Gaussian filter in FIG. 19B is represented by replacing y in Expression 2 by y'=y/2. This embodiment, as illustrated in FIG. 19B, employs an anisotropic Gaussian filter having a long side in the x direction. By matching the direction of this long-side axis to the direction in which an detection target density unevenness extends, the same result can be obtained as the case where the division size and shift amount are set as described in the above embodiment.

In this embodiment, luminance data of a target pixel is filtered using one Gaussian filter and quantized thereby to obtain a result. This process is performed for multiple different sized Gaussian filters, and the results are added. By doing so, a defect extraction process can be performed on the basis of an addition result equivalent to that in the first embodiment.

Figure 20:
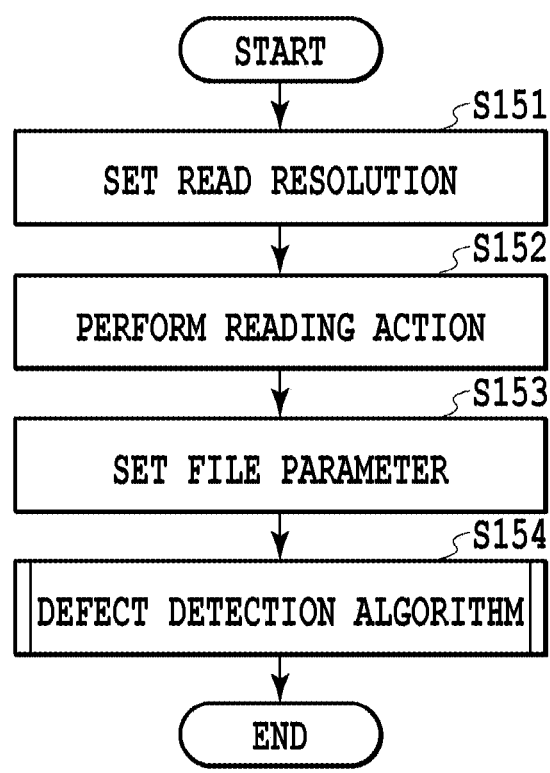
FIG. 20 is a flowchart illustrating basic steps of defect detection according to a fourth embodiment.

In this embodiment as well, the image processing apparatus 1 can take various forms as described with FIGS. 1A to 1D. FIG. 20 is a basic flowchart of a defect detection algorithm performed by the image processing apparatus 1 in this embodiment. When this process is started, in Step S151 the image processing apparatus 1 sets a read resolution and in subsequent Step S152 a reading action is performed on an inspection target. Steps S151 and S152 are equivalent to Step S1 and Step S2 in FIG. 5.

In Step S153, the CPU 301 sets multiple types of file parameters of the Gaussian filter to be used for the defect extraction process performed in subsequent Step S154. The file parameters define the directionality of a Gaussian function as described with FIGS. 19A and 19B, and different filter sizes (Gaussian filter diameters) F. Here, the file parameters are set such that the Gaussian filter is anisotropic. Then in Step S154, on the basis of the file parameters set in Step S153, the predetermined defect detection algorithm is performed on the image data generated in Step S152.

Figure 21:
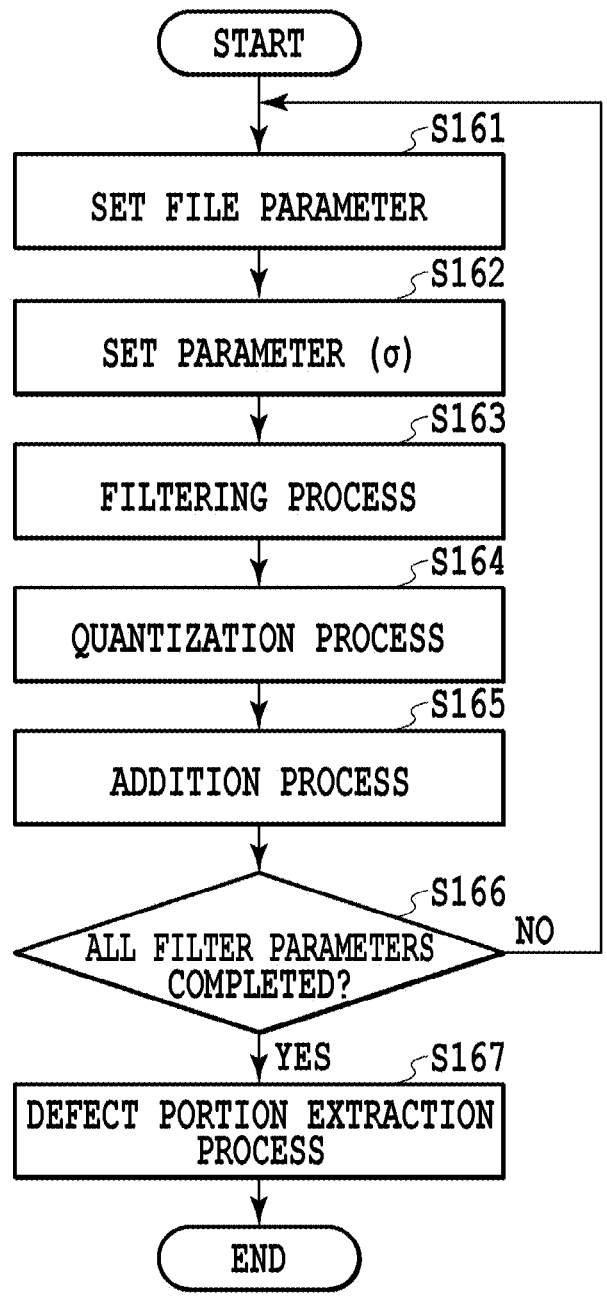
FIG. 21 is a flowchart illustrating a defect detection algorithm according to the fourth embodiment.

FIG. 21 is a flowchart for explaining the steps of the defect detection algorithm performed by the CPU 301 in Step S154. The process illustrated here is performed one-by-one on pixels in the image acquired in Step S152.

When this process is started, in Step S161, the CPU 301 first sets one file parameter from the multiple file parameters set in Step S153. Further, in Step S162, the CPU 301 sets a parameter σ corresponding to the file parameter set in Step S161. The parameter σ corresponds to the standard deviation of a Gaussian function, and is preliminarily stored in a memory in association with a file parameter and a filter size. Setting the file parameter and the parameter σ in Steps S161 and S162 determines the shape of a Gaussian filter.

In subsequent Step S163, the Gaussian filter set in Steps S161 and S162 is used to perform a filtering process on the image data acquired in Step S152. Specifically, respective pieces of luminance data of the target pixel and its neighboring pixels falling within the filter size F are multiplied by a coefficient determined by the Gaussian filter, and the sum of the pieces of luminance data multiplied by the coefficient are calculated as a filtering process value for the target pixel.

In Step S164, a quantization process is performed on the filtering process value obtained in Step S163, and further, in Step S165, a quantized value obtained in Step S164 is added to addition image data. The addition image data refers to image data for obtaining a result of adding pieces of quantized data obtained when variously changing the file parameters, i.e., variously changing the type of a Gaussian filter. If the quantized data obtained in Step S164 is a result of the first Gaussian filter, the addition image data is the same as the quantized data obtained in Step S164.

In subsequent Step S166, the image processing apparatus 1 determines whether or not all the file parameters set in Step S153 have been processed. If the image processing apparatus 1 determines that a file parameter to be processed still remains, the flow returns to Step S161 where the next file parameter is set. On the contrary if the image processing apparatus 1 determines that all the file parameters have been processed, the flow proceeds to Step S167.

In Step S167, on the basis of currently obtained addition image data, the defect portion extraction process is performed. An extraction method is not particularly limited as in the first embodiment. This process ends here.

As with the above embodiment, this embodiment also ensures that a density unevenness can be extracted. When the filter size is too large, then a luminance value after a filtering process is not sufficiently high even if a target pixel is within a white stripe, and therefore a defect portion cannot be extracted. For this reason, in this embodiment, the filter size F is provided with a maximum value Fmax and a minimum value Fmin, and in Step S153 only a filter size between Fmax and Fmin is set.

As described above, in this embodiment, in Step S153 in FIG. 20, a file parameter is set such that the Gaussian filter is anisotropic as illustrated in FIG. 19B. This enables a defect to be efficiently extracted. As such an anisotropic filter, a low pass filter or a Gabor filter can be employed besides the Gaussian filter.

Other Embodiments

An inspection target image is not limited to an image printed using an inkjet print head, and any printing method can be used as long as an image is printed serially from one side to the other side of the image. Any reading method of such an image is also employed. In short, any method for reading the image printed in this way also can be employed as long as image data resulting from reading the image printed serially in one direction can be obtained.

The present invention can also be achieved by a process adapted to supply a program realizing one or more functions of the above embodiments to a system or an apparatus through a network or a storage medium and to cause one or more processors in the system or apparatus to read and perform the program. In addition, the present invention can also be achieved by a circuit (e.g., an ASIC) realizing the one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132878 filed Jul. 1, 2015, which is hereby incorporated by reference wherein in its entirety.

What is claimed is:

1. An image processing apparatus comprising:
an acquisition unit configured to acquire image data resulting from reading an image printed sequentially in a first direction, the image being printed on a print medium by a relative movement in the first direction between the print medium and a printing member provided in a second direction crossing the first direction;

a setting unit configured to set a division size in the first direction and the second direction of a division area composed of a plurality of pixels for dividing the image, and to set different shift amounts in the first direction and the second direction of the division area including a target pixel, the different shift amounts being set using the target pixel as a reference;

an averaging unit configured to perform an averaging process on the image data in the division area of the image using the division size and the shift amount set by the setting unit as a unit;

a quantization unit configured to quantize a value that is obtained by the averaging process of the averaging unit;

an adding unit configured to add a value for the target pixel obtained by the quantization of the quantization unit for each of the cases where the image is divided by a predetermined division size and the different shift amounts set by the setting unit; and an output unit configured to output an additional result of the adding unit, wherein the setting unit sets (i) the division size equal to or greater in the second direction than in the first direction, and/or (ii) the maximum shift amount greater in the second direction than in the first direction.

2. The image processing apparatus according to claim 1, wherein the acquisition unit acquires image data resulting from reading an image printed by multiple printing elements of the printing member arrayed in the second direction.

3. The image processing apparatus according to claim 1, wherein the image is printed on the print medium along with the relative movement of the print medium and the printing member having multiple printing elements arrayed in the second direction.

4. The image processing apparatus according to claim 1, wherein the setting unit sets multiple types of division sizes, and the adding unit further adds the addition result for each of the multiple types of division sizes.

5. The image processing apparatus according to claim 1, further comprising an extraction unit configured to extract a unique portion from the additional result output from the output unit.

6. The image processing apparatus according to claim 5, wherein the extracting unit performs a pop-up process for making an area of the unique portion apparent.

7. The image processing apparatus according to claim 5, further comprising a unit for storing an area of a unique portion extracted by the extracting unit and generating an image processing parameter for correcting the unique portion.

8. The image processing apparatus according to claim 5, further comprising a unit of determining presence of a unique portion on the basis of information extracted by the extracting unit.

9. The image processing apparatus according to claim 5, further comprising a display control unit configured to make a display unit display a processing result of the extraction unit.

10. The image processing apparatus according to claim 1, wherein the shift amount is defined with one pixel as a unit, and the setting unit sets a plurality of shift amounts smaller than or equal to the maximum shift amount in the first direction and the second direction.

11. The image processing apparatus according to claim 10, wherein the setting unit sets all shift amounts smaller than or equal to the maximum shift amount in the first direction and the second direction.

12. The image processing apparatus according to claim 1, wherein $$(Sx+Kx)>(Sy+Ky)$$

where $Sx$ is the division size in the first direction, $Sy$ is the division size in the second direction, $Kx$ is the shift amount in the first direction, and $Ky$ is the shift amount in the second direction.

13. The image processing apparatus according to claim 12, wherein $Sx=Sy$.

14. A printing apparatus comprising:
an image processing apparatus;
a printing member being provided in a second direction; and
a reading unit configured to read an image printed by the printing member thereby to generate image data,
the image processing apparatus comprising:
an acquisition unit configured to acquire image data from the reading unit, the image being printed on a print medium sequentially in a first direction crossing the second direction by a relative movement between the print medium and the printing member in the first direction;

a setting unit configured to set a division size in the first direction and the second direction of a division area composed of a plurality of pixels for dividing the image, and to set different shift amounts in the first direction and the second direction of the division area including a target pixel, the different shift amounts being set using the target pixel as a reference;

an averaging unit configured to perform an averaging process on the image data in the division area of the image using the division size and the shift amount set by the setting unit as a unit;

a quantization unit configured to quantize a value that is obtained by the averaging process of the averaging unit;

an adding unit configured to add a value for the target pixel obtained by the quantization of the quantization unit for each of the cases where the image is divided by a predetermined division size and the different shift amounts set by the setting unit; and an output unit configured to output an additional result of the adding unit; wherein the setting unit sets (i) the division size equal to or greater in the second direction than in the first direction, and/or (ii) the maximum shift amount greater in the second direction than in the first direction.

15. An image processing method comprising:
an acquisition step of acquiring image data resulting from reading an image printed sequentially in a first direction, the image being printed on a print medium by a relative movement in the first direction between the print medium and a printing member provided in a second direction crossing the first direction;

a setting step of setting a division size in the first direction and a second direction of the division area composed of a plurality of pixels for dividing the image and to set different shift amounts in the first direction and the second direction of the division area including a target pixel, the different shift amounts being set using the target pixel as a reference;

a averaging step of performing an averaging process on the image data in the division area of the image using the division size and the shift amount set by the setting step as a unit;

a quantization step of quantizing a value that is obtained by the averaging process of the averaging step;

an adding step of adding a value for the target pixel obtained by the quantization step for each of the cases where the image is divided by a predetermined division size and the different shift amounts set by the setting step; and an output step of outputting an additional result of the adding step, wherein the setting step sets (i) the division size equal to or greater in the second direction than in the first direction and/or (ii) the maximum shift amount greater in the second direction than in the first direction.

16. The image processing method according to claim 15, wherein the acquisition step acquires image data resulting from reading an image printed by multiple printing elements of the printing member arrayed in the second direction.

17. The image processing method according to claim 15, wherein the image is printed on the print medium along with the relative movement of the print medium and the printing member having multiple printing elements arrayed in the second direction.

18. The image processing method according to claim 15, wherein the setting step sets multiple types of division sizes, and the adding step further adds the addition result for each of the multiple types of division sizes.

19. The image processing method according to claim 15, further comprising an extracting step of extracting a unique portion from the additional result output by the output step, wherein the extracting step performs a pop-up process for making an area of the unique portion apparent.

20. The image processing method according to claim 15, further comprising:

an extracting step of extracting a unique portion from the additional result output by the output step; and a storing step of storing an area of the unique portion extracted in the extracting step and generating an image processing parameter for correcting the unique portion.

21. The image processing method according to claim 15, further comprising:

an extracting step of extracting a unique portion from the additional result output by the output step; and a determining step of determining presence of the unique portion on the basis of information extracted in the extracting step.

* * * * *